US011410450B2

(12) United States Patent
Jo et al.

(10) Patent No.: US 11,410,450 B2
(45) Date of Patent: Aug. 9, 2022

(54) METHOD FOR MANUFACTURING AN ELECTRONIC DEVICE INCLUDING MULTIPLE FIXING MEMBERS TO FIX A BIOMETRIC SENSOR TO A DISPLAY

(71) Applicant: Samsung Electronics Co., Ltd., Gyeonggi-do (KR)

(72) Inventors: Jeonggyu Jo, Gyeonggi-do (KR); Joohan Kim, Gyeonggi-do (KR); Jinman Kim, Gyeonggi-do (KR); Bokyung Sim, Gyeonggi-do (KR); Bongjae Rhee, Gyeonggi-do (KR); Yongwon Lee, Gyeonggi-do (KR); Daekwang Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/386,422

(22) Filed: Apr. 17, 2019

(65) Prior Publication Data
US 2019/0325188 A1     Oct. 24, 2019

(30) Foreign Application Priority Data

Apr. 17, 2018 (KR) .................... 10-2018-0044283
Aug. 24, 2018 (KR) .................... 10-2018-0099211

(51) Int. Cl.
*G06V 40/13* (2022.01)
*G06F 1/16* (2006.01)
(Continued)

(52) U.S. Cl.
CPC ........ *G06V 40/1306* (2022.01); *G06F 1/1626* (2013.01); *G06F 1/1637* (2013.01);
(Continued)

(58) Field of Classification Search
CPC ... G06K 9/0002; G06F 1/1626; G06F 1/1637; G06F 1/1684; G06F 3/0412; G06F 21/32; C09J 2301/416; C09J 5/06
See application file for complete search history.

(56) References Cited

U.S. PATENT DOCUMENTS 7,919,356 B2     4/2011  Farooq et al.
8,604,906 B1 *  12/2013  Halferty ............ H04W 12/1206
                                              340/5.83
(Continued)

FOREIGN PATENT DOCUMENTS

EP    3 279 778 A1    2/2018
JP    H11-97325 A     4/1999
(Continued)

OTHER PUBLICATIONS

European Search Report dated Sep. 9, 2019.
International Search Report dated Aug. 6, 2019.

*Primary Examiner* — David D Davis
(74) *Attorney, Agent, or Firm* — Cha & Reiter, LLC

(57) ABSTRACT

An electronic device includes a display including a first surface facing a first direction to output display information and a second surface facing a second direction opposite the first direction, a biometric sensor including a sensing surface disposed to face a partial area of the second surface of the display and a side surface formed in a lateral direction, a first fixing member interposed between the partial area of the second surface and the biometric sensor such that the sensing surface is attached to the partial area of the second surface, and hardened at a specified temperature, and a second fixing member attached to at least a portion of the side surface and at least a portion of a peripheral area adjacent to the partial area of the second surface and hardened by light of a specified wavelength.

20 Claims, 17 Drawing Sheets

(51) Int. Cl.
*G06F 3/041* (2006.01)
*G06F 21/32* (2013.01)
(52) U.S. Cl.
CPC .......... *G06F 1/1684* (2013.01); *G06F 3/0412* (2013.01); *G06F 21/32* (2013.01)

(56) References Cited

U.S. PATENT DOCUMENTS

| | | | |
|---|---|---|---|
| 9,836,637 | B2 | 12/2017 | Merrell et al. |
| 9,870,033 | B1* | 1/2018 | Browning .............. G06F 1/1684 |
| 9,983,656 | B2 | 5/2018 | Merrell et al. |
| 10,235,552 | B2 | 3/2019 | D'Souza et al. |
| 2006/0138438 | A1 | 6/2006 | Katagami |
| 2012/0271121 | A1 | 10/2012 | Della Torre et al. |
| 2015/0199554 | A1 | 7/2015 | Merrell et al. |
| 2016/0300096 | A1 | 10/2016 | Kim et al. |
| 2017/0139244 | A1 | 5/2017 | Zhang et al. |
| 2017/0192482 | A1 | 7/2017 | Merrell et al. |
| 2017/0300736 | A1* | 10/2017 | Song .................. G06K 9/00033 |
| 2017/0351850 | A1* | 12/2017 | Jin ........................ G06F 3/0414 |
| 2017/0357842 | A1* | 12/2017 | Park ...................... G06K 9/0002 |
| 2017/0372110 | A1* | 12/2017 | Uehara ................... G06F 3/041 |
| 2017/0372114 | A1* | 12/2017 | Cho ...................... G01J 1/0219 |
| 2018/0035923 | A1* | 2/2018 | Kang ..................... A61B 5/117 |
| 2018/0039368 | A1* | 2/2018 | Choi ..................... G06F 3/0416 |
| 2018/0039815 | A1* | 2/2018 | Jung .................. G06K 9/00013 |
| 2018/0042127 | A1* | 2/2018 | Kim .................. H05K 9/0084 |
| 2018/0053034 | A1 | 2/2018 | Merrell et al. |
| 2018/0059298 | A1* | 3/2018 | Lee .......................... H04N 5/33 |
| 2018/0096187 | A1* | 4/2018 | Kwon .................. G06F 1/1613 |
| 2018/0101711 | A1* | 4/2018 | D'Souza ................ G06K 9/228 |
| 2018/0151641 | A1* | 5/2018 | Choo .................. H04M 1/0266 |
| 2018/0373913 | A1* | 12/2018 | Panchawagh ........ G06K 9/0002 |
| 2019/0073507 | A1 | 3/2019 | D'Souza et al. |
| 2019/0163003 | A1* | 5/2019 | Kim ..................... G06F 3/0412 |

FOREIGN PATENT DOCUMENTS

| | | |
|---|---|---|
| JP | 2004-14559 A | 1/2004 |
| JP | 2006-145263 A | 6/2006 |
| JP | 2006-181419 A | 7/2006 |
| JP | 3974834 B2 | 9/2007 |
| JP | 2008-000986 A | 1/2008 |
| JP | 2010-177274 A | 8/2010 |
| JP | 2012-69599 A | 4/2012 |
| KR | 10-0650904 B1 | 11/2006 |
| KR | 10-2014-0024845 A | 3/2014 |
| KR | 10-2018-0013328 A | 2/2018 |
| WO | 2014/156960 A1 | 10/2014 |

\* cited by examiner

METHOD FOR MANUFACTURING AN ELECTRONIC DEVICE INCLUDING MULTIPLE FIXING MEMBERS TO FIX A BIOMETRIC SENSOR TO A DISPLAY

CROSS-REFERENCE TO RELATED APPLICATION(S)

This application is based on and claims priority under 35 U.S.C. § 119 to Korean Patent Application No. 10-2018-0044283, filed on Apr. 17, 2018, and Korean Patent Application No. 10-2018-0099211, filed on Aug. 24, 2018, in the Korean Intellectual Property Office, the disclosure of which is incorporated by reference herein its entirety.

BACKGROUND

1. Field

The present disclosure generally relates to an electronic device including a biometric sensor to sense fingerprint information of a user and a method for manufacturing the same.

2. Description of Related Art

Recently, biometric sensors have been developed that may be used to perform user authentication by using bio-information (e.g., fingerprint, iris, or the like) of the user. Different technologies, such as optical, ultrasonic, or capacitive, may be used to implement biometric sensors for fingerprint recognition.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, a method for manufacturing an electronic device to fix a biometric sensor to a display is provided. The method includes a first step of providing a transparent cover. The method includes a second step of providing a display disposed below the transparent cover and a biometric sensor disposed below the display. The method includes a third step of applying a first fixing member to a sensing surface of the biometric sensor. The method includes a fourth step of disposing the sensing surface of the biometric sensor, to which the first fixing member is applied, on a bottom surface of the display. The method includes a fifth step of attaching a second fixing member to at least a portion of the biometric sensor and to the bottom surface of the display where the sensing surface is attached through the first fixing member. In this case, the second fixing member is disposed in a peripheral area of a partial area of the bottom surface. The method includes a sixth step of hardening the second fixing member and hardening the first fixing member. The first fixing member may be configured to be heat-curable and the second fixing member may be configured to be curable by light of a specified wavelength.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
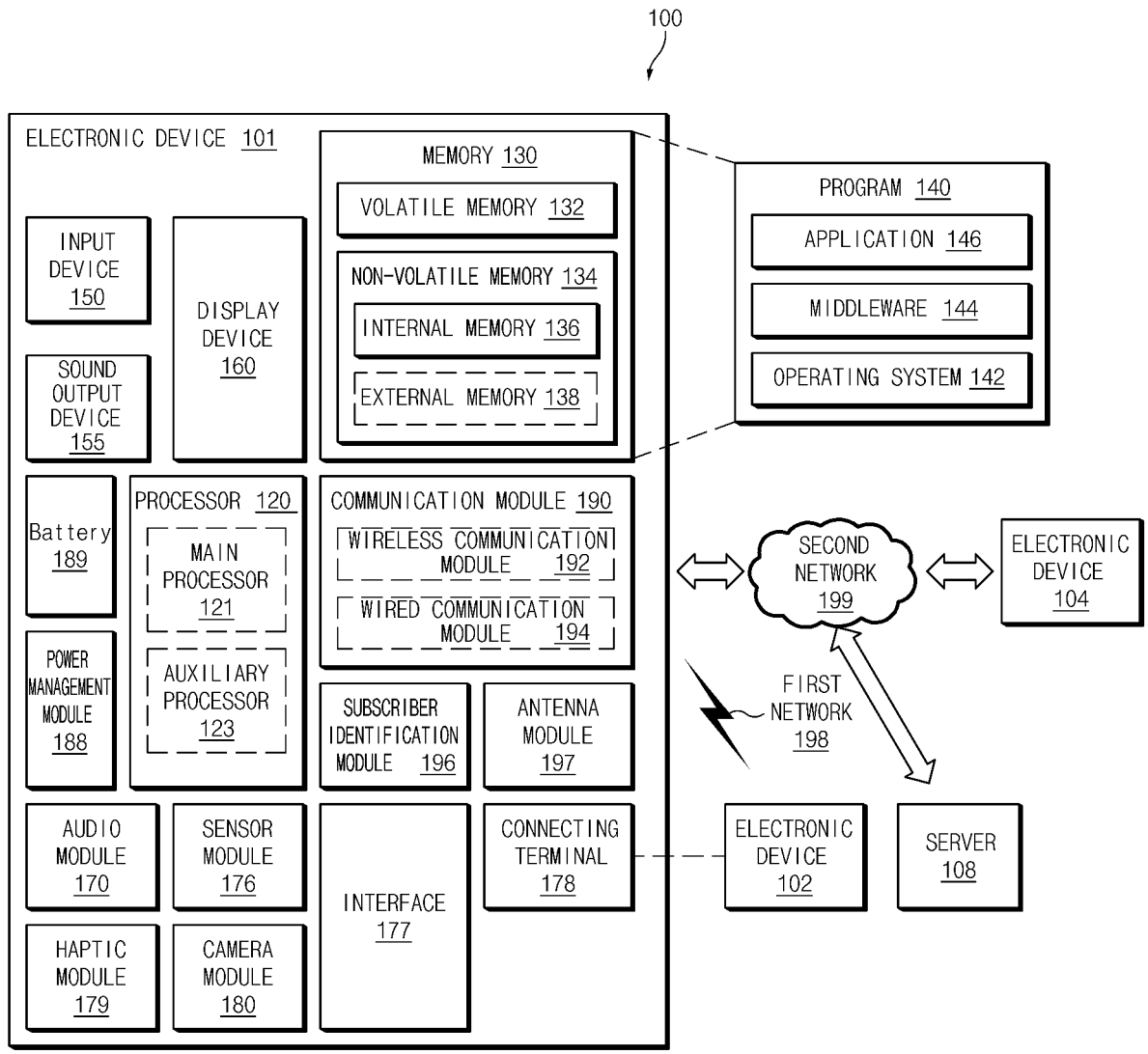
FIG. 1 is a block diagram illustrating an electronic device in a network environment, according to certain embodiments.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure. In the following description made with respect to the accompanying drawings, similar components will be assigned with similar reference numerals.

A biometric sensor may be disposed on a front surface of an electronic device, where the display may also be disposed. Alternatively, to maximize the display area of the display, the biometric sensor may be disposed on a rear surface of the display. When fixing the biometric sensor on the rear surface of the display, the display may be damaged.

In addition, when the biometric sensor is disposed on the rear surface of the display, the display area including the biometric sensor may be visually different from the other portions of the display area having no the biometric sensor. For example, the display area including the biometric sensor may be visually different from the peripheral area of the display area.

Certain aspects of the present disclosure are to address at least the above-mentioned problems and/or disadvantages and to provide at least the advantages described below.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load an instruction or data received from another component (e.g., the sensor module 176 or the communication module 190) in volatile memory 132, process the instruction or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for at least one instruction related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive an instruction (or a command) or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a board (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., instructions or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The sensor module 176 of the electronic device 101 described above may include a biometric sensor disposed under the display 160. The biometric sensor may include, for example, a sensor driven in an ultrasonic manner. The biometric sensor may irradiate an ultrasonic wave from the lower portion (e.g., the rear surface of the display 160) of the display 160 toward the upper portion (e.g., an upper portion of the cover glass or the external cover) of the display 160 and may collect a response signal to the irradiated ultrasonic wave as information associated with the fingerprint recognition. The biometric sensor may be fixed on the rear surface of the display 160.

Figure 2:
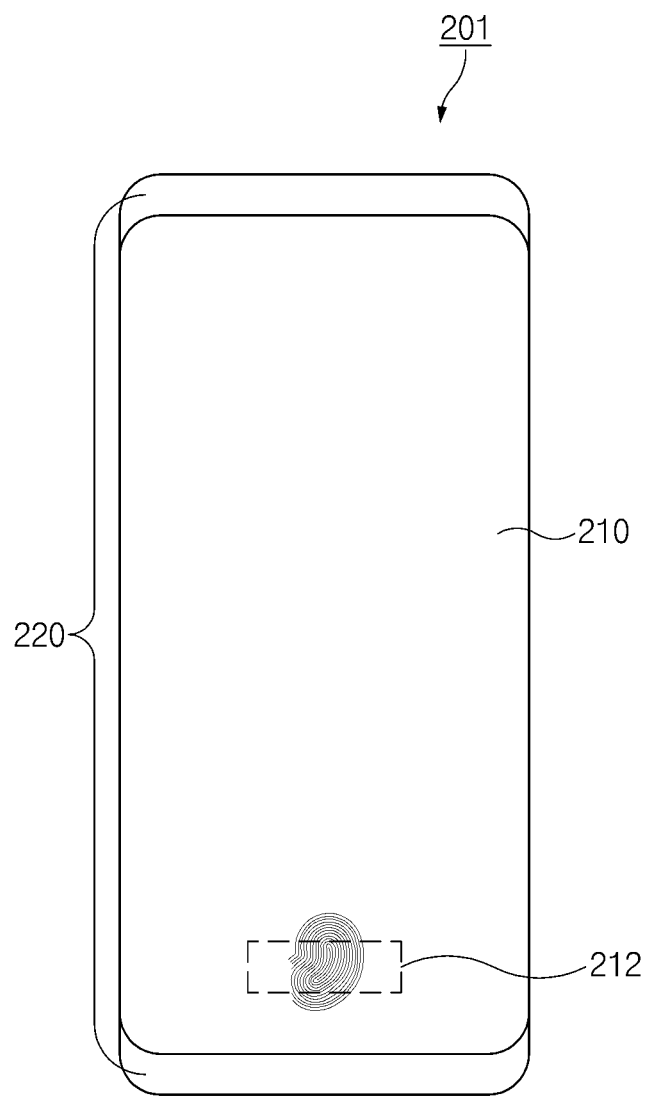
FIG. 2 is a view illustrating an exterior of an electronic device, according to an embodiment.

FIG. 2 is a view illustrating an exterior of an electronic device, according to an embodiment.

Referring to FIG. 2, according to an embodiment, a display (or a display device or a display panel) 210 and at least a portion of a housing 220 (or a frame) may be included in (or exposed through) a front surface of an electronic device 201. According to an embodiment, the housing 220 may provide only the side surface or rear surface of the electronic device 201. That is, the front surface of the electronic device 201 may be made up entirely of the display surface.

According to an embodiment, the electronic device 201 may include various hardware modules which are not illustrated. For example, a biometric sensor (or a fingerprint sensor) to detect the fingerprint of a user may be disposed on the rear surface of the display 210, i.e. on the surface of the display 210 not facing the user. As shown, in one embodiment, the biometric sensor may be disposed at a lower portion of the display 210.

According to an embodiment, the electronic device 201 may detect the fingerprint of the user through a fingerprint sensing area 212 of the display 210. Accordingly, the biometric sensor may be disposed on the rear surface of the display 210 at a location corresponding to the fingerprint sensing area 212.

According to an embodiment of the disclosure, the biometric sensor may be fixed onto the rear surface of the display 210 by using polymer or resin (or at least one adhesive member).

Accordingly, aspects of the present disclosure are to provide an electronic device that includes a structure capable of stably fixing a biometric sensor on a rear surface of a display without breaking or modifying the rear surface of the display, and a method for manufacturing the same.

Additional aspects of the present disclosure are to provide an electronic device having a display with improved visual quality and a method for manufacturing the same.

In FIG. 2, the electronic device 201 is provided by way of example, and the present disclosure is not limited to the above-described example. For example, a receiver, a camera module, an iris sensor, or other biometric sensors may be disposed on various surfaces of the electronic device 201.

Figure 3:
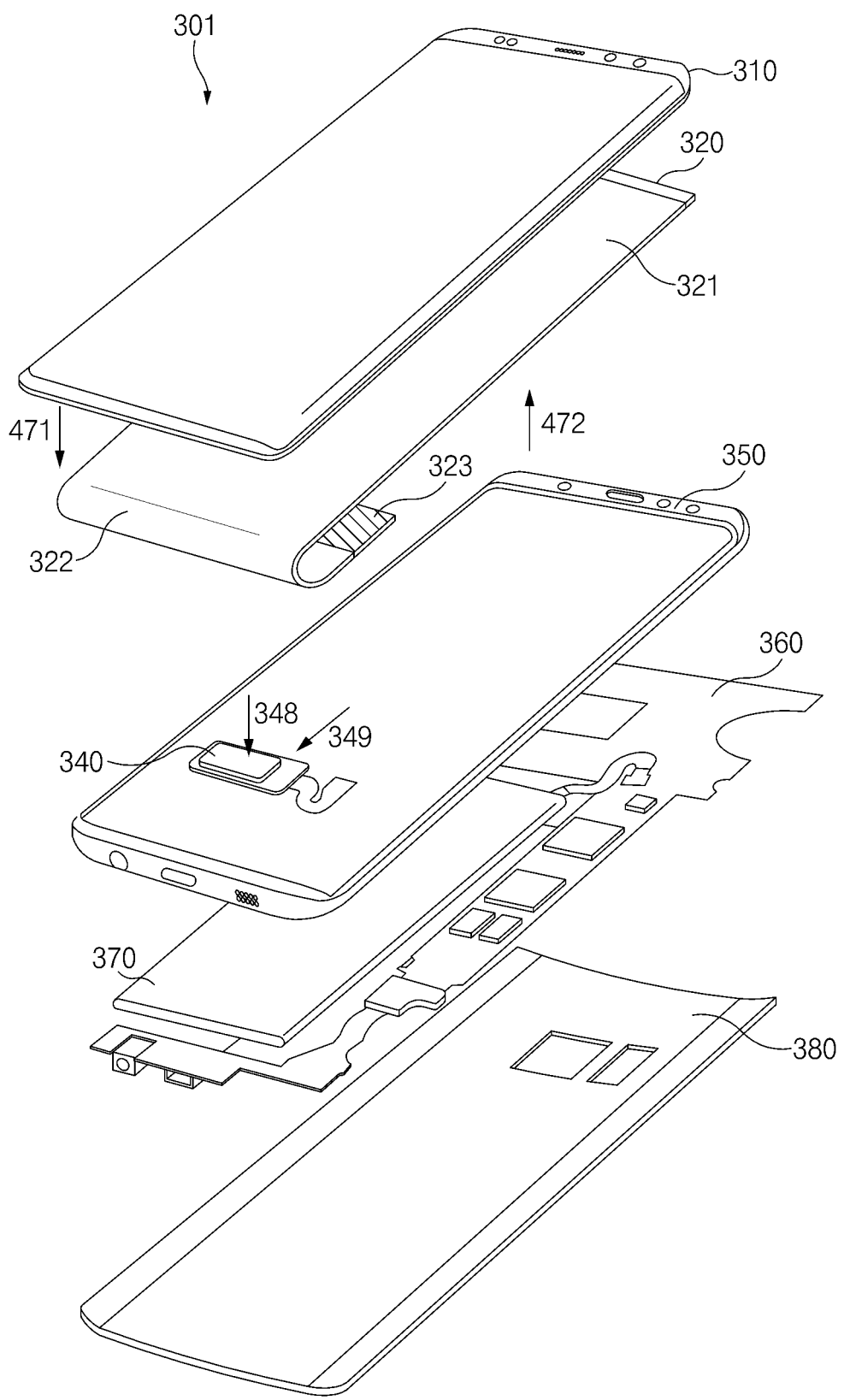
FIG. 3 is an exploded perspective view illustrating an electronic device, according to an embodiment.

FIG. 3 is an exploded perspective view illustrating an electronic device, according to an embodiment.

Referring to FIG. 3, according to an embodiment, an electronic device 301 (e.g., the electronic device 201 of FIG. 2) may include a cover glass 310, a display (or a display panel) 320 (e.g., the display 210 of FIG. 2), a biometric sensor module 340 (or a biometric sensor, or a biometric sensor device) (e.g., a fingerprint sensor), a housing 350 (e.g., the housing 220 of FIG. 2), a circuit board 360, a battery 370, and a rear cover 380 (or a back cover). According to other embodiments, the electronic device 301 may not include some of components illustrated in FIG. 3, and may additionally include components which are not illustrated in FIG. 3.

The cover glass 310 may be transparent so as to allow transmission of at least a portion of light generated from the display 320. In addition, a user may place a portion (e.g., a finger) of his/her body on the cover glass 310 to perform touch operations. Alternatively, the user may perform touch operations with an electronic pen. To enable touch operations, a touch panel may be disposed below the cover glass 310. For example, the touch panel may be disposed above or below the display 320 or be integrated with the display 320. The cover glass 310 may be made of, for example, tempered glass, reinforced plastic, flexible polymer material, or the like to protect components included in the electronic device 301 from external shock. The cover glass 310 may be referred to as a "glass window".

The display 320 may include a first surface 471 to output display information and a second surface 472 disposed in a direction opposite to the direction of the first surface 471. The display 320 may be disposed under the cover glass 310 or may be coupled to the cover glass 310. Accordingly, at least a portion of the display 320 may be exposed through at least a portion of the cover glass 310. The display 320 may output content (e.g., text, image, video, icon, widget, symbol, etc.) and may receive touch inputs or electronic pen inputs from the user. With regard to the electronic pen input, a pen panel associated with the operation of the electronic pen may be disposed with the display 320. The electronic pen input may be detected by the pen panel while the touch panel is disposed between the cover glass 310 and the pen panel.

As described above, the display 320 may include a display panel and a touch panel or sensor. Alternatively, the display 320 may further include an electronic pen panel or sensor in associated with the electronic pen input. For example, the display panel may include, for example, a liquid crystal display (LCD) panel, a light-emitting diode (LED) display panel, an organic LED (OLED) display panel, a microelectromechanical systems (MEMS) display panel, or an electronic paper display panel. The touch sensor may include a capacitive touch panel, a pressure sensitive touch panel, a resistive touch panel, an infrared touch panel, or an ultrasonic touch panel. The touch sensor may be inserted between display panels (an add-on touch panel), may be directly formed on the display panel (an on-cell touch panel), or may be included in the display panel (an in-cell touch panel). The electronic pen sensor (e.g., a digitizer) may detect contacts, gestures, or hovering inputs from the electronic pen.

According to an embodiment, the display 320 may include a planar area 321 and a bending area 322 that extends from a side (e.g., upper side, lower side, left side, or right side) of the planar area 321. At least a portion of the bending area 322 may include a non-display area. Alternatively, the entire portion of the bending area 322 may include a non-display area. Wires to supply a signal to pixels arranged in the planar area 321 may be disposed in at least a portion of the non-display area. According to an embodiment, the display 320 may further include edge areas that are bent while extending from the left or right side of the planar area 321. Accordingly, at least a portion of the front surface of the display 320 may be provided in a convex form.

The planar area 321 may have pixels (e.g., OLED pixels) of the display panel, a conductive pattern of the touch sensor, and/or a conductive pattern of an electronic pen sensor, which are both arranged in the planar area 321. The bending area 322 may be electrically connected with a flexible printed circuit board 323 positioned on the rear surface of the display 320 through various conductive patterns (wires).

According to an embodiment, a portion of the bending area 322 may be bent toward the rear surface of the planar area 321. According to an embodiment, the wires of the FPCB 323 may be electrically connected with to the circuit board 360 through a particular connector. According to an embodiment, pixels to display various content may be arranged in at least a portion of the bending area 322, similarly to the planar area 321.

The biometric sensor module 340 may include, for example, a biometric sensor including a sensing surface 348 arranged to face a partial area of the second surface 472 of the display 320, and a lateral side surface 349 that is facing a direction different from the direction of the sensing surface 348. The sensing surface 348 may be a surface where signals used to obtain fingerprint information are transceived. The biometric sensor module 340 (e.g., the fingerprint sensor) may be disposed under the display 320 or may be coupled to the rear surface of the display 320. For example, the biometric sensor module 340 may be attached to the rear surface of the planar area 321 of the display 320.

The biometric sensor module 340 may sense bio-information (e.g., fingerprint information) of the user. The biometric sensor module 340 may include, for example, an ultrasonic biometric sensor. For example, the biometric sensor module 340 may transceive ultrasonic waves by using at least one piezoelectric layer and an electrode layer. The ultrasonic wave reflected from the user's finger may be transmitted to an image collecting layer (e.g., a thin film type transistor layer or a complementary metal oxide semiconductor image sensor (CMOS) layer, or a charge-coupled device (CCD) layer) and may be used to capture or obtain a fingerprint image. Unique fingerprint information may be extracted from the fingerprint image, and may be used for user authentication when compared with previously-stored fingerprint information of the user.

The housing 350 may form at least a portion of the exterior of the electronic device 301 and may house components included in the electronic device 301. For example, the housing 350 may form various side surfaces (e.g., upper surface, lower surface, left side surface and/or right side surface) of the electronic device 301. According to an embodiment, the housing 350 may be comprised of a plurality of sub-housings which are assembled together. The housing 350 may be referred to as a "rear case" or "rear plate." According to an embodiment, at least a portion of the side surface of the housing 350 may be metallic so as to be used for an antenna structure.

According to an embodiment, the housing 350 may include a bracket (not shown). The bracket may be made of, for example, a magnesium alloy and may be disposed under the display 320 and over the circuit board 360. The bracket may be coupled to the display 320 and the circuit board 360 to physically support the display 320 and the circuit board 360.

According to one embodiment, the circuit board 360 may be disposed under the housing 350 (or over the housing 350). According to an embodiment, various parts, devices, other printed circuit board or sub-circuit boards, and/or other components (e.g., processor, memory, communication circuitry or the like) of the electronic device 301 may be mounted or arranged on the circuit board 360. According to an embodiment, the circuit board 360 may be referred to as a "main board," "printed board assembly (PBA)," or simply "PCB." The circuit board 360 may include, for example, a main circuit board and a sub-circuit board. According to an embodiment, the main circuit board and the sub-circuit board may be electrically connected with each other through a particular connector. The circuit board 360 may be, for example, implemented as a rigid PCB.

The battery 370 may convert chemical energy to electrical energy and/or convert electrical energy to chemical energy. For example, the battery 370 may convert chemical energy to electrical energy and may supply the electrical energy to various components or modules mounted in the display 320, the biometric sensor module 340, and the circuit board 360. According to an embodiment, a power management module (e.g., a power management integrated circuit (PMIC)) to manage charging/discharging of the battery 370 may be disposed in the circuit board 360.

The rear cover 380 may be coupled to the rear surface of the electronic device 301. The rear cover 380 may be made of tempered glass, a plastic injection molded product, and/or metal. According to alternative embodiments, the rear cover 380 may be implemented integrally with the housing 350 or may be implemented detachably from the housing 350 by a user The biometric sensor of the biometric sensor module 340 may be fixed onto one side of the second surface 472 of the display 320 through a first fixing member and a second fixing member (or a first adhesive member and a second adhesive member). The first fixing member may be interposed between a partial area of the second surface 472 of the display 320 and the biometric sensor such that the sensing surface 348 is attached to the partial area of the second surface 472 of the display 320, and may be hardened at a specified temperature. The second fixing member may be attached to at least a portion of the side surface 349 of the biometric sensor and at least a portion of a peripheral area adjacent to the partial area of the second surface 472 of the display 320 and may be hardened by light having a specified wavelength.

Figure 4A:
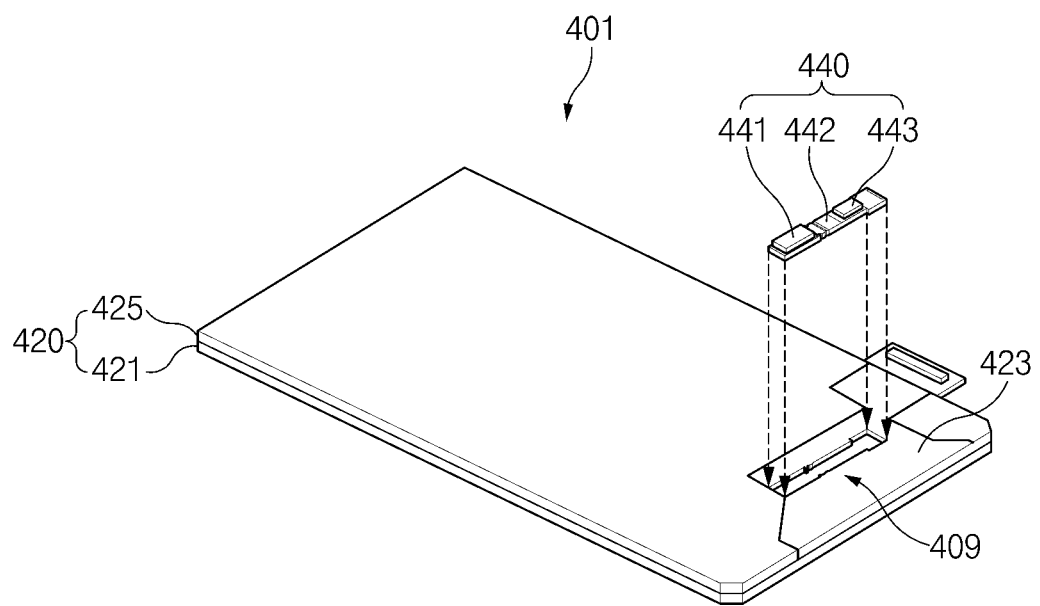
FIG. 4A is a view illustrating a state when a biometric sensor module and a display of the electronic device are separated from each other, according to an embodiment of the disclosure.
Figure 4B:
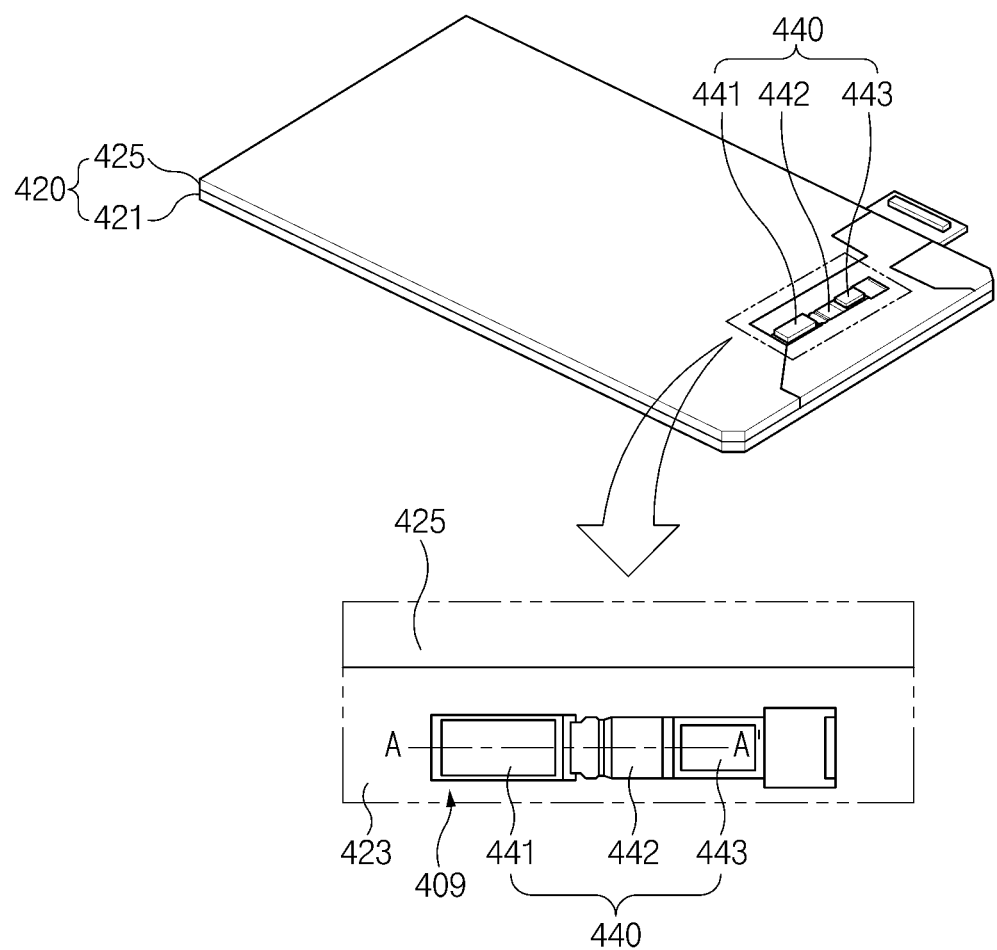
FIG. 4B is a view illustrating a state when the biometric sensor module and the display of the electronic device are coupled to each other, according to an embodiment of the disclosure.

FIG. 4A is a view illustrating a state when the biometric sensor module and the display of the electronic device are separated from each other, according to an embodiment of the disclosure. FIG. 4B is a view illustrating a state when the biometric sensor module and the display of the electronic device are coupled to each other, according to an embodiment of the disclosure.

Referring to FIGS. 4A and 4B, an electronic device 401 (e.g., the electronic device 301 of FIG. 3) may include a display (or a display panel, or a display module, or a display panel module) 420 (e.g., the display 320 of FIG. 3), a first circuit board 423 (e.g. a multi-layered FPCB (M-FPCB), and a biometric sensor module 440 (e.g., the biometric sensor module 340 of FIG. 3).

According to an embodiment, the display 420 may include a first panel layer 421 and a second panel layer 425 (or an auxiliary layer or a panel rear surface layer). According to an embodiment, the first panel layer 421 may include at least one light emitting device. According to an embodiment, the first panel layer 421 may include at least one layer that allows transmission of signals having a specific wavelength band (e.g., signals having an ultrasonic wavelength band (ultrasonic signal)). For example, the first panel layer 421 may include at least one organic material layer (e.g., at least one insulating layer or a poly-imides (PI) layer). In addition, the first panel layer 421 may include at least one organic material layer and at least one metal layer (e.g., a wire layer). When transmitting an ultrasonic wave, the medium characteristics of at least one organic material layer and the at least one metal layer may be similar or identical to each other within a specific tolerance such that the ultrasonic wave is effectively transmitted. For example, the difference in medium characteristic between the organic material layer and the metal layer may be within the specific tolerance range.

A signal having a specified wavelength band (e.g., an ultrasonic signal) may be output from the biometric sensor module 440, which is disposed at the lower portion of the first panel layer 421. The signal may then be transmitted to an upper portion of the first panel layer 421 (e.g., the portion contacting the cover glass 310) via vibrations of the first panel layer 421. The signal may be reflected from a finger (or the surface of at least a portion of a fingerprint) of the user in contact with the cover glass, and the reflected signal may be transmitted to the biometric sensor module 440 in the form of vibration through the first panel layer 421. The absorbing degree or the reflection degree of the ultrasonic signal may be varied due to the difference in impedance between the first panel layer 521 and air (e.g. the layer of air between the user's finger and the cover glass 310) or the difference in impedance between the first panel layer 521 layer and the fingerprint of the user. For example, the ultrasonic signal may be absorbed into the fingerprint at the ridge of the fingerprint touching onto the cover glass 310, and may be reflected from the valley of the fingerprint and transmitted to the biometric sensor module 440.

According to an embodiment, the second panel layer 425 may be disposed on the rear surface of the first panel layer 421. According to an embodiment, the second panel layer 425 may include a sensor disposing area 409 (or a sensor disposing hole) to receive a biometric sensor module (e.g., the biometric sensor module 340 of FIG. 3). The sensor disposing area 409 may have a hole through the front and rear surfaces of the second panel layer 425 so that the biometric sensor module 440 faces a partial area of the first panel layer 421 when it is mounted in the second panel layer 425.

The second panel layer 425 may be disposed under the first panel layer 421 to perform one or more functions. These functions include heat radiation to radiate heat emitted from the first panel layer 421, breakage reduction to reduce pressure applied to the first panel layer 421, electromagnetic wave suppression, and improving the visual appearance of the first panel layer 421. The second panel layer 425 may include one or more sub-layers that each individually performs one of the functions described above. Alternatively, two or more of the sub-layers may perform one of the functions in aggregate. When the second panel layer 425 includes a plurality of sub-layers, the above-mentioned hole or recess or groove may be formed by removing at least some portion of the sub-layers from the sensor disposing area 409. Accordingly, the biometric sensor module 440 disposed in the sensor disposing area 409 may be disposed while directly facing the bottom surface of the first panel layer 421, or may be disposed under the first panel layer 421 through at least some sub-layers.

The first circuit board 423 (e.g., the FPCB 323 of FIG. 3) may extend from one side (e.g., the bottom surface) of the first panel layer 421 and may be electrically connected with the first panel layer 421. A display integrated circuit (IC) and/or a touch sensor IC may be disposed on the first circuit board 423. According to an embodiment, the first circuit board 423 may be operatively or electrically connected with the circuit board 360 described in connection to FIG. 3. The sensor disposing area 409 may be provided at one side of the first circuit board 423.

According to an embodiment, the size of the sensor disposing area 409 may be provided to be equal to the size of the biometric sensor module 440 or to be greater than the size of the biometric sensor module 440 by a specified margin. The sensor disposing area 409 may be formed through the first circuit board 423 and the second panel layer 425. Alternatively, the sensor disposing area 409 may be provided by removing some of at least one sub-layer of the second panel layer 425 while passing through the first circuit board 423.

The biometric sensor module 440 (e.g., the biometric sensor module 340 of FIG. 3) may be used to obtain bio-information of the user, such as fingerprint information. The biometric sensor module 440 may include a biometric sensor 441, a second circuit board 442, and a sensor circuit 443 (or a sensor IC).

At least a portion of the biometric sensor 441 may be attached to the rear surface of the display 420. For example, one surface of the biometric sensor 441 may be attached to the rear surface of the first panel layer 421 through at least a portion of the first circuit board 423. Alternatively, the biometric sensor 441 may be attached to the rear surface of the first panel layer 421 through at least a portion (e.g., a through hole or a groove) of the first circuit board 423 and at least a portion of the second panel layer 425. Still alternatively, when some sub-layers of the second panel layer 425 are disposed throughout the entire portion of the rear surface of the first panel layer 421, the biometric sensor 441 may be fixed onto the some sub-layers through at least a portion of the first circuit board 423 and through other sub-layers of the second panel layer 425. The biometric sensor 441 may irradiate a signal having a specific wavelength band (e.g., an ultrasonic signal), may collect the signal after it has been reflected from an object in contact with the cover glass 310, and may transmit the collected signal to the sensor circuit 443 through the second circuit board 442.

According to an embodiment, the second circuit board 442 may be electrically connected the biometric sensor 441 and the sensor circuit 443 via signal lines. At least a portion of the second circuit board 442 may be provided in the form of an anisotropic conductive film (ACF). Alternatively, at least a portion of the second circuit board 442 may be provided in the form of a flexible PCB (FPCB). A connector may be disposed at a portion of the second circuit board 442 connected with the sensor circuit 443.

The sensor circuit 443 may extract the fingerprint information by processing a signal received through the second circuit board 442. Alternatively, the sensor circuit 443 may extract image information corresponding to a fingerprint, and may transmit the image information to a processor (e.g., the processor 120 of FIG. 1) of the electronic device 401.

Figure 5:
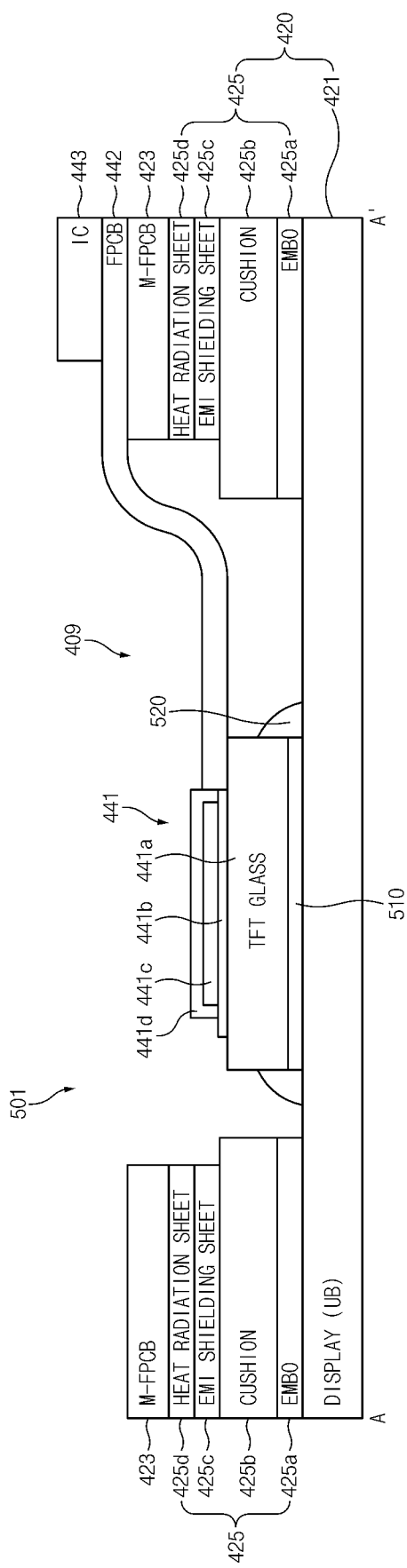
FIG. 5 is a cross-sectional view taken along line A-A' of FIG. 4B.

FIG. 5 is a cross-sectional view taken along line A-A' of FIG. 4B.

Referring to FIG. 5, an electronic device 501 (e.g., the electronic device 301 of FIG. 3) may include a display (e.g., the display 320 of FIG. 3) including the first panel layer 421 and the second panel layer 425, the first circuit board 423, and the biometric sensor module 440. The electronic device 501 may include a first fixing member 510 (or a first adhesive member) to fix the biometric sensor 441 of the biometric sensor module 440 and a second fixing member 520 (or the second adhesive member). A cover glass may be further disposed on one surface of the first panel layer 421, which is not shown in FIG. 5.

The second panel layer 425 may include at least one of a first sub-layer 425a, a second sub-layer 425b, a third sub-layer 425c, or a fourth sub-layer 425d. Although the drawing illustrates that the second panel layer 425 includes the first sub-layer 425a, the second sub-layer 425b, the third sub-layer 425c, and the fourth sub-layer 425d, the present disclosure is not limited thereto. For example, the second panel layer 425 may include only some (e.g., the first sub-layer 425a and the second sub-layer 425b or the first sub-layer 425a and the fourth sub-layer 425d) of first sub-layers shown. The first sub-layer 425a may include, for example, an embossed layer. The second sub-layer 425b may include, for example, a cushion layer to absorb impact. The third sub-layer 425c may include, for example, an electro-magnetic interference (EMI) shielding sheet (e.g., Cu sheet) to shield EMI. The fourth sub-layer 425d may include, for example, a heat radiation sheet (e.g., a graphite sheet) to radiate heat emitted from the first panel layer 421.

The biometric sensor module 440 may include, for example, the biometric sensor 441, the second circuit board 442, and the sensor circuit 443.

The biometric sensor 441 may irradiate a signal having a specific wavelength band (e.g., an ultrasonic signal) and then may collect the signal as it is reflected. In this regard, the biometric sensor 441 may include a board layer 441a, a circuit layer 441b, a piezoelectric material layer 441c, and an electrode layer 441d. The board layer 441a may include, for example, a silicon layer, an insulated silicon layer, a thin film transistor (TFT) layer, a glass layer, a plastic layer, a ceramic layer, or a combination thereof. The circuit layer 441b may include, for example, a thin film transistor (TFT) circuit formed in a TFT layer. Alternatively, the circuit layer 441b may include a CMOS or CCD layer formed on the silicon layer. The circuit layer 441b, the piezoelectric material layer 441c, and the electrode layer 441d may serve as a signal transceiving layer to output the signal having a specified wavelength band or to receive the reflected signal.

For example, the piezoelectric material layer 441c and the electrode layer 441d may correspond to the circuit layer 441b. When power is supplied to the circuit layer 441b and the electrode layer 441d, the piezoelectric material layer 441c interposed between the circuit layer 441b and the electrode layer 441d may irradiate the signal having a specific wavelength band (e.g., an ultrasonic signal), where the signal corresponds to material properties of the piezoelectric material layer 441c. The piezoelectric material layer 441c may also receive the reflected signal. Accordingly, the signal transceiving layer including the circuit layer 441b, the piezoelectric material layer 441c, and the electrode layer 441d may irradiate a signal by at least a portion thereof while receiving a reflected signal of the irradiated signal by a remaining portion thereof. Alternatively, based on specific time intervals, the signal transceiving layer may irradiate the signal for a first period and may receive the reflected signal at a second period following the first period.

The second circuit board 442, which may be an FPCB, may be electrically connected with the biometric sensor 441 at one side thereof and may be connected with the sensor circuit 443 at an opposite side thereof. The second circuit board 442 may be separated from the first panel layer 421 by a specific distance. According to an embodiment, one side of the second circuit board 442 may contain Anisotropic Conductive Film (ACF) and may be electrically connected with signal wires (or electrode pads formed at ends of the signal wires) provided at one side of the biometric sensor 441. The opposite side of the second circuit board 442 may be electrically connected with the connector and electrically connected to the sensor circuit 443.

The sensor circuit 443 may generate and transmit a control signal associated with the driving of the biometric sensor 441. The sensor circuit 443 may control the biometric sensor 441 to irradiate an ultrasonic signal under the control of a processor (e.g., the processor 120 of FIG. 1) and may obtain fingerprint information by receiving the reflected signal of the ultrasonic signal. The sensor circuit 443 may transmit the obtained fingerprint information to the processor. The fingerprint information may include, for example, image information generated based on the reflected signal of the ultrasonic signal or feature information of the obtained image.

The first fixing member 510 may be interposed between the biometric sensor 441 and the first panel layer 421. Specifically, the first fixing member 510 may be interposed between the board layer 441a of the biometric sensor 441 and the first panel layer 421. The first fixing member 510 may include thermosetting resin that is hardened as heat at a specific temperature is applied to the thermosetting resin for a specific time. For example, the first fixing member 510 may include epoxy resin. The first fixing member 510 may be applied to one surface (e.g., on the board layer 441a) of the biometric sensor 441 or be injected onto the sensor disposing area 409 of the first panel layer 421. The biometric sensor 441 having the first fixing member 510 applied to the board layer 441a may be placed on a portion of the first panel layer 421 corresponding to the sensor disposing area 409 using a jig. A particular heating chamber may be provided to harden the first fixing member 510, in order to bond the first panel layer 421 to the biometric sensor 441. The first fixing member 510 may be hardened in the chamber having a specified temperature environment for specified time (e.g., at about 50-100° C. for about 5-60 minutes, or at about 70° C. for about 10 minutes), when the biometric sensor 441 is fixed onto the rear surface of the first panel layer 421 by using the second fixing member 520.

The second fixing member 520 may be used to fix the biometric sensor 441, after the biometric sensor 441, to which the first fixing member 510 in a first state (non-hardening state) is applied, is placed on the rear surface of the first panel layer 421 corresponding to the sensor disposing area 409. In this regard, the second fixing member 520 may be disposed in at least a portion of a peripheral portion of the biometric sensor 441. For example, the second fixing member 520 may be applied to a corner portion of the biometric sensor 441. Alternatively, as the second fixing member 520 may be applied to at least a portion of a circumference of the biometric sensor 441. The second fixing member 520 may be an adhesive member having properties different from those of the first fixing member 510. For example, the second fixing member 520 may include at least one of a UV-curable resin, a urethane-based resin, or an acrylic-based resin. According to an embodiment, the second fixing member 520 may include a material that does not chemically react with the first fixing member 510 or chemically react to emit heat of a certain degree between the second fixing member 520 and the first fixing member 510 so as to prevent adhesion force from being reduced due to the chemical reaction.

In the electronic device 501 described above, the second fixing member 520 in the first state (e.g., the non-hardening state) may be applied to the contact portion (e.g., at least a portion of the edge of the biometric sensor 441) between the biometric sensor 441 and the first panel layer 421 to fix the biometric sensor 441, when the first fixing member 510 is also in the first state (e.g., the non-hardening state) while interposed between the board layer 441a and the first panel layer 421, and the biometric sensor 441 is disposed on a portion of the first panel layer 421 corresponding to the sensor disposing area 409. Thereafter, the second fixing member 520 may be hardened (e.g., hardened by UV light) and thus deformed to be in a second state (e.g., a hardening state). As the hardening of the second fixing member 520 is completed within several seconds to several minutes, the biometric sensor 441 may be rapidly fixed onto the sensor disposing area 409 without damaging or deforming the peripheral structure of the first panel layer 421. While the first fixing member 510 in the first state and the second fixing member 520 in the second state, the display 420 may be placed in the curing chamber for the first fixing member 510. Thereafter, when the first fixing member 510 is heated in the chamber at a specified temperature for a specified time (e.g., the specified temperature and the specified time being in ranges that do not damage the biometric sensor module 440 and the display 420), the first fixing member 510 may be deformed to be in the second state (e.g., a hardening state). As described above, when bonding the biometric sensor 441 to the first panel layer 421, a jig is used to grip the biometric sensor 441, heat is not applied to the first fixing member 510, thereby preventing damage to the display 420 in contact with the biometric sensor 441 from being broken or flawed (or preventing the display 420 from being crushed, dented, or wrinkled, preventing polyethylene terephthalate (PET) constituting a portion of the first panel layer 421 from being deformed, preventing a bonding layer on a bonding surface from being deformed to be viewed at the outside, or preventing the rear surface or the bonding surface of the first panel layer 421 from being wrinkled or de-colored).

Figure 6:
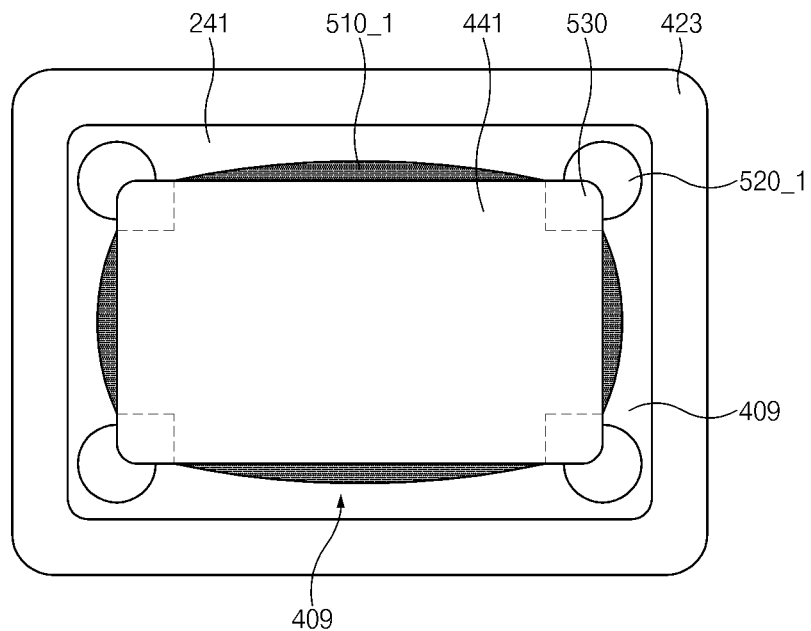
FIG. 6 are various views of a sensor disposing area, according to an embodiment of the disclosure.
Figure 6:
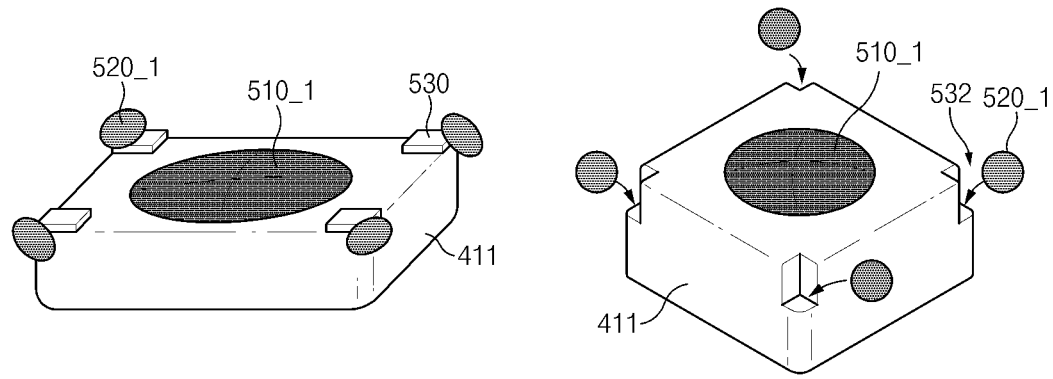
Figure 6:
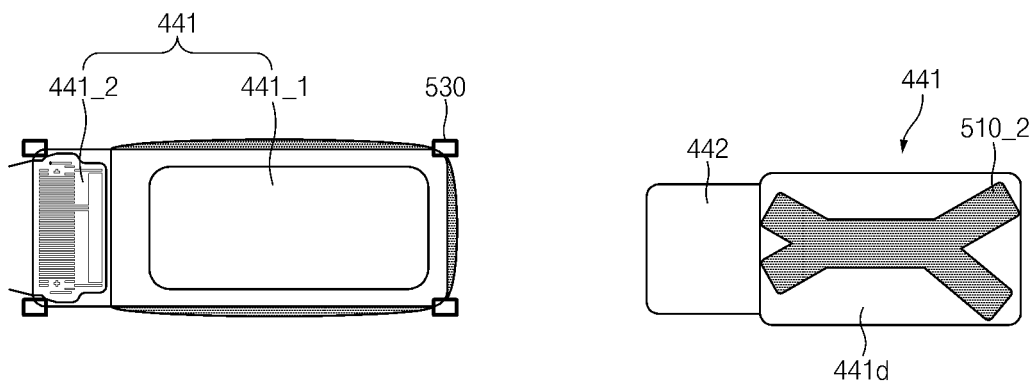

FIG. 6 is various views of the sensor disposing area, according to an embodiment of the disclosure.

Referring to states 601 and 603 in FIG. 6, according to an embodiment of the disclosure, the sensor disposing area 409, in which the biometric sensor 441 is disposed, may include an area in which at least a portion of the first panel layer 421 is in contact with the biometric sensor 441 when at least a portion of the second panel layer 425 described with reference to FIGS. 4A, 4B, and 5 is removed. State 601 illustrates a state where a first fixing member 510_1 in the first state (e.g., the non-hardening state) and a second fixing member 520_1 in the first state (e.g., the non-hardening state), and where the first fixing member 510_1 and the second fixing member 520_1 are applied after the biometric sensor 441 is disposed on the rear surface of the first panel layer 421 corresponding to the sensor disposing area 409. State 603 illustrates a state where the first fixing member 510_1 in the first state, and the second fixing member 520_1 in the first state are disposed, and a spacer 530 is provided.

The first fixing member 510_1 in the first state, when between the first panel layer 421 and the biometric sensor 441, may be pressed at a specific pressure by a jig. Accordingly, because the first fixing member 510_1 in the first state is not yet hardened, a portion of the first fixing member 510_1 may protrude out of the edge of the biometric sensor 441, as the space between the first panel layer 421 and the biometric sensor 441 is reduced by the jig. The portion of the first fixing member 510_1 protruding from the peripheral portion of the biometric sensor 441 may be referred to as a fillet structure.

According to an embodiment, the biometric sensor 441, which has a particular thickness, may include at least one spacer 530 arranged in the corner portions thereof. For example, at least one spacer 530 having specific thicknesses may be arranged in corner portions (e.g. all four corner portions) of the biometric sensor 441. The at least one spacer 530 is interposed between the biometric sensor 441 and the first panel layer 421, thereby maintaining a specific distance between the biometric sensor 441 and the first panel layer 421. By preventing the jig from reducing the space between the first panel layer 421 and the biometric sensor 441 to less than the specific distance (e.g. height of the spacer 530), the first fixing member 510_1, which is in the first state, may be prevented from protruding out of the corner portions. The second fixing member 520_1 in the first state may then be applied to each corner area of the biometric sensor 441. For example, the second fixing member 520_1 in the first state may be introduced into the gap between the spacer 530 and the first panel layer 421. While the second fixing member 520_1 in the first state is subject to the UV hardening, the biometric sensor 441 may be more firmly fixed on the sensor disposing area (or the first panel layer 421).

As illustrated state 605, the biometric sensor 441 has grooves 532 instead of the spacers 530. The grooves 532 may be provided in corner portions of the biometric sensor 441 and the first fixing member 510_1 in the first state may be applied onto a board layer (e.g., the top surface of the biometric sensor 441 shown in the figure) of the biometric sensor 441. While the biometric sensor 441, to which the first fixing member 510_1 in the first state is applied, is placed in the sensor disposing area 409, at least a portion of the first fixing member 510_1 in the first state may protrude out of the edge of the biometric sensor 441 as described in state 601. According to various embodiments, the first fixing member 510_1 in the first state may less protrude or may not protrude through the corner area having the groove 532. As the second fixing member 520_1 in the first state is applied between one surface (e.g., the rear surface of the first panel layer 421) of the sensor disposing area 409 and the groove 532 of the biometric sensor 441, the second fixing member 520_1 in the first state may have a larger contact area with the biometric sensor 441. Accordingly, while the second fixing member 520_1 in the first state (e.g., the non-hardening state) is hardened, the biometric sensor 441 may be more firmly fixed. The spacer 530 or the groove 542 may be used to space the first fixing member 510 and the second fixing member 520 apart from each other by a particular distance. According to various embodiments, the spacer 530 or the groove 542 may be used to uniformly maintain the distance between the first fixing member 510 and the second fixing member 520. For example, as the display 420 is bonded to the biometric sensor 441, the first fixing member 510 (or resin corresponding to the first fixing member 510) is widely spread in the space between the biometric sensor 441 and the first panel layer 421. According to various embodiments, the resin may be spread to areas where the spacer 530 or the groove 542 is not disposed. Accordingly, contact between the first panel layer 421, the second fixing member 520, and the biometric sensor 441 may be sufficiently ensured, and the distance between the first fixing member 510 and the second fixing member 520 may be maintained.

State 607 illustrates the biometric sensor 441 in more detail. The biometric sensor 441 may include an active area 441_1 that irradiates an ultrasonic signal associated with fingerprint sensing and a wiring area 441_2 having signal wires (or electrode pads connected with the signal wires) to supply power to circuits (e.g., the circuit layer 441b, TFT substrate) disposed in the active area 441_1. The wiring area 441_2 may be electrically connected with the second circuit board 442 using ACF. The spacer 530 may be disposed in the corner area of the biometric sensor 441. For example, spacers 530 may be disposed at two places of the active area 441_1 and two places of the wiring area 441_2 of the biometric sensor 441.

State 609 illustrates a particular shape 510_2 of the first fixing member when the first fixing member is applied onto the biometric sensor 441 through an injector. As illustrated in state 609, the first fixing member may be applied such that at least one side of the shape 510_2 has the shape of "Y" (or "T" or "t"). As the above-described first fixing member having the applied form 510_2 is uniformly spread by pressure applied to the fixing member while the first fixing member is bonded to the sensor disposing area 409, the first fixing member 510_1 in the first state partially protrudes out of the edge area while being uniformly placed between the biometric sensor 441 and the first panel layer 421, as illustrated in state 601 or state 607. For example, after pressing, the applied form 510_2 may have an oval shape.

Figure 7:
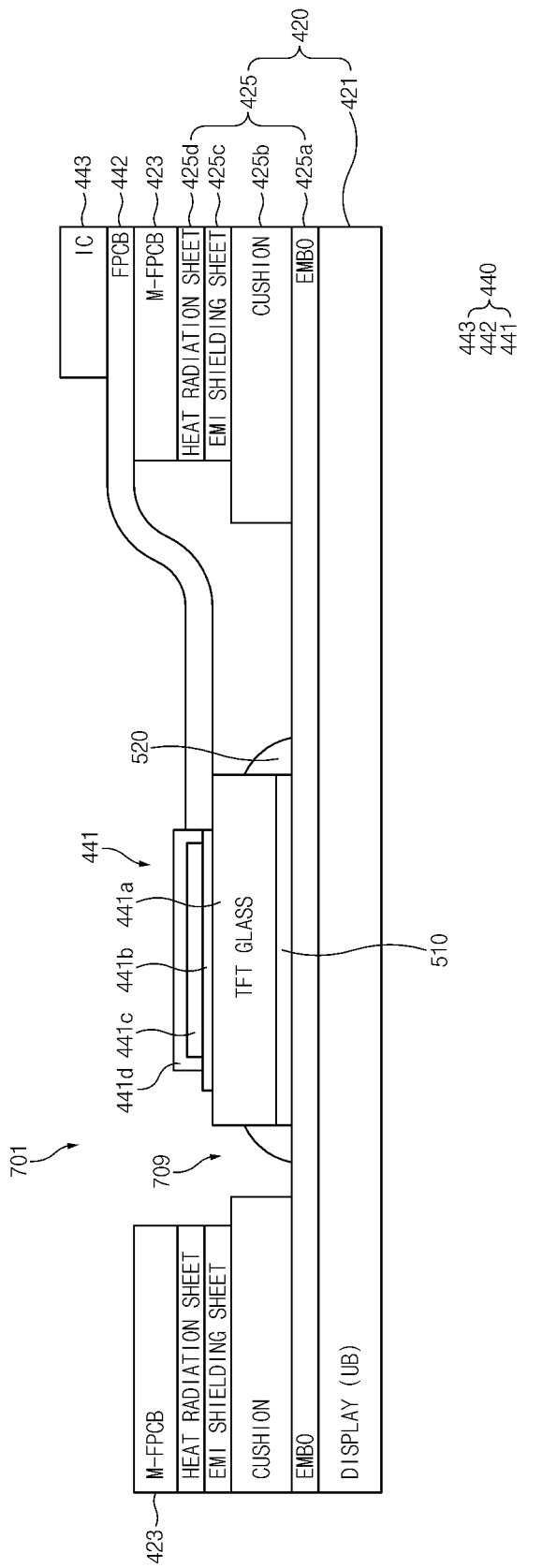
FIG. 7 is a view illustrating fixing a biometric sensor onto a display panel layer, according to an embodiment of the disclosure.

FIG. 7 is a view illustrating fixing of a biometric sensor onto a display panel layer, according to another embodiment of the disclosure. FIG. 7 is another cross-sectional view taken along line A-A' of FIG. 4B.

Referring to FIG. 7, according to an embodiment, some components of an electronic device 701 (e.g., the electronic device 301 of FIG. 3) may include, for example, the display 420 (e.g., the first panel layer 421 and a second panel layer 425), the first circuit board 423, and the biometric sensor module 440. The biometric sensor module 440 may include, for example, the biometric sensor 441, the second circuit board 442, and the sensor circuit 443. The first panel layer 421, the first circuit board 423, and the biometric sensor module 440 may be the same components as the panel layer, the first circuit board, and the biometric sensor module described in connection to FIG. 5.

The second panel layer 425 may include the first sub-layer 425a, the second sub-layer 425b, the third sub-layer 425c, and the fourth sub-layer 425d. In this case, the second panel layer 425 may include a smaller number of layers compared with the second panel layer disclosed in FIG. 5. In contrast with FIG. 5, the first sub-layer 425a may remain in the sensor disposing area 709 without having a portion removed. The second sub-layer 425b, the third sub-layer 425c, and the fourth sub-layer 425d may be removed from the sensor disposing area 709.

The biometric sensor 441 may be disposed on the first sub-layer 425a provided in the sensor disposing area 709. The first fixing member 510 may be interposed between the biometric sensor 441 and the first sub-layer 425a. The second fixing member 520 may be interposed between a corner area of the biometric sensor 441 and the first sub-layer 425a.

The electronic device 701 described in the above structure may obtain fingerprint information as the ultrasonic signal passes through the first sub-layer 425a. As the first sub-layer 425a is not removed in the sensor disposing area 709, the sensor disposing area 709 and areas other than the sensor disposing area 709 may be viewed visually similarly to each other. Accordingly, even if the user looks at the display 420 where the biometric sensor 441 is disposed, the user may not visually notice any difference in the sensor disposing area 709 due to the first sub-layer 425a. Thus, according to an embodiment, the electronic device may improve the visual quality of the display. In addition, the manner for manufacturing the electronic device 701 may prevent the first panel layer 421 from being deformed or de-colored or may improve the visual quality of the display. This may be done by fixing the biometric sensor 441 onto the first sub-layer 425a without directly disposing the biometric sensor 441 on the first panel layer 421. Here, the deformation of the first panel layer 421 may include wrinkling, sagging, breaking, or combining a portion of the first panel layer 421 with another structure (e.g., the biometric sensor 441 or the first adhesive layer).

Figure 8:
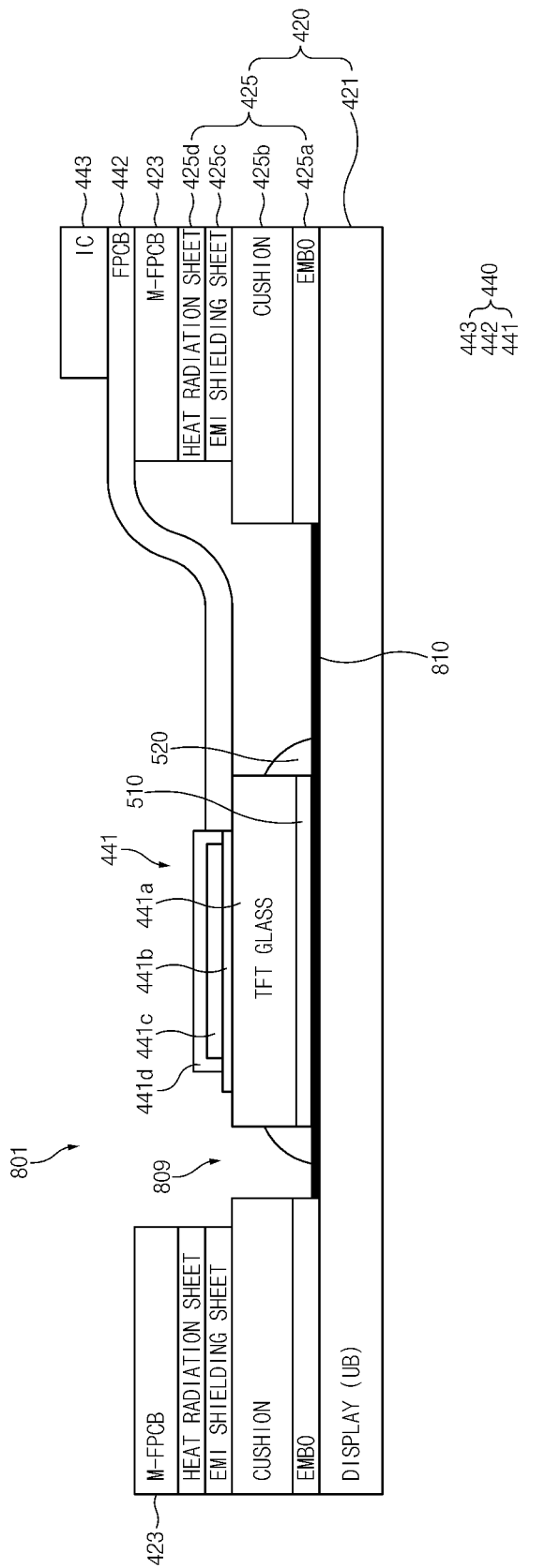
FIG. 8 is a view illustrating fixing of a biometric sensor onto a display panel layer, according to another embodiment of the disclosure.

FIG. 8 is a view illustrating fixing of a biometric sensor onto a display panel layer, according to another embodiment of the disclosure. FIG. 8 illustrates another cross-sectional view taken along line A-A' of FIG. 4B.

Referring to FIG. 8, according to an embodiment, some components of an electronic device 801 (e.g., the electronic device 301 of FIG. 3) may include, for example, the display 420 (e.g., the first panel layer 421 and the second panel layer 425), the auxiliary layer 810, the first circuit board 423, and the biometric sensor module 440. The biometric sensor module 440 may include, for example, the biometric sensor 441, the second circuit board 442, and the sensor circuit 443. The first panel layer 421, the second panel layer 425, the first circuit board 423, and the biometric sensor module 440 may be the same components as the panel layer, a layer, the first circuit board, and the biometric sensor module described above in connection to FIG. 5. The second panel layer 425 may include the first sub-layer 425a, the second sub-layer 425b, the third sub-layer 425c, and the fourth sub-layer 425d.

The auxiliary layer 810 may be disposed on the first panel layer 421 (on a portion of the rear surface of the first panel layer 421) of the sensor disposing area 809 in which the biometric sensor 441 is disposed. The auxiliary layer 810 may be provided by applying ink in a specified color using an ink-jet process or a spray process. For example, the auxiliary layer 810 may include a black ink layer. Alternatively, the auxiliary layer 810 may include a layer formed by applying ink in the same color as the color of the second panel layer 425. The auxiliary layer 810 may be provided by applying ink several times to achieve a specific thickness (that is, repeating applying ink, drying the ink, and then applying ink on top of the dried black ink). The auxiliary layer 810 may have a specific thickness and color density such that fingerprint information having a specific resolution or more is obtained as the ultrasonic signal irradiated from the biometric sensor 441 is reflected. The auxiliary layer 810 may be placed on the same plane (e.g., the rear surface of the first panel layer 421) as the first sub-layer 425a. The auxiliary layer 810 may be thinner than the first sub-layer 425a.

The biometric sensor 441 may be disposed on the auxiliary layer 810 provided in the sensor disposing area 809. The first fixing member 510 may be interposed between the biometric sensor 441 and the auxiliary layer 810. The second fixing member 520 may be interposed between a corner area of the biometric sensor 441 and the auxiliary layer 810.

The electronic device 801 as shown in FIG. 8 may properly obtain fingerprint information while at the same time have the sensor disposing area 809 and other display areas be visually similarly. For example, even if a user views the display 420 in the direction that the biometric sensor 441 is disposed, from the top of the first panel layer 421, the user may view the sensor disposing area 809 and the peripheral area of the sensor disposing area 809 as being in the same form due to the auxiliary layer 810. Thus, according to an embodiment, the electronic device 801 may improve the visual quality of the display. In addition, hardening of the first panel layer 421 may be by the first fixing member 510 may be alleviated because the first fixing member 510 is not directly disposed on the first panel layer 421 and the biometric sensor 441 is disposed onto the auxiliary layer 810. Accordingly, the method for manufacturing the electronic device 801 may prevent the first fixing member 510 from being deformed or decolored due to the hardening of the first fixing member 510.

Figure 9:
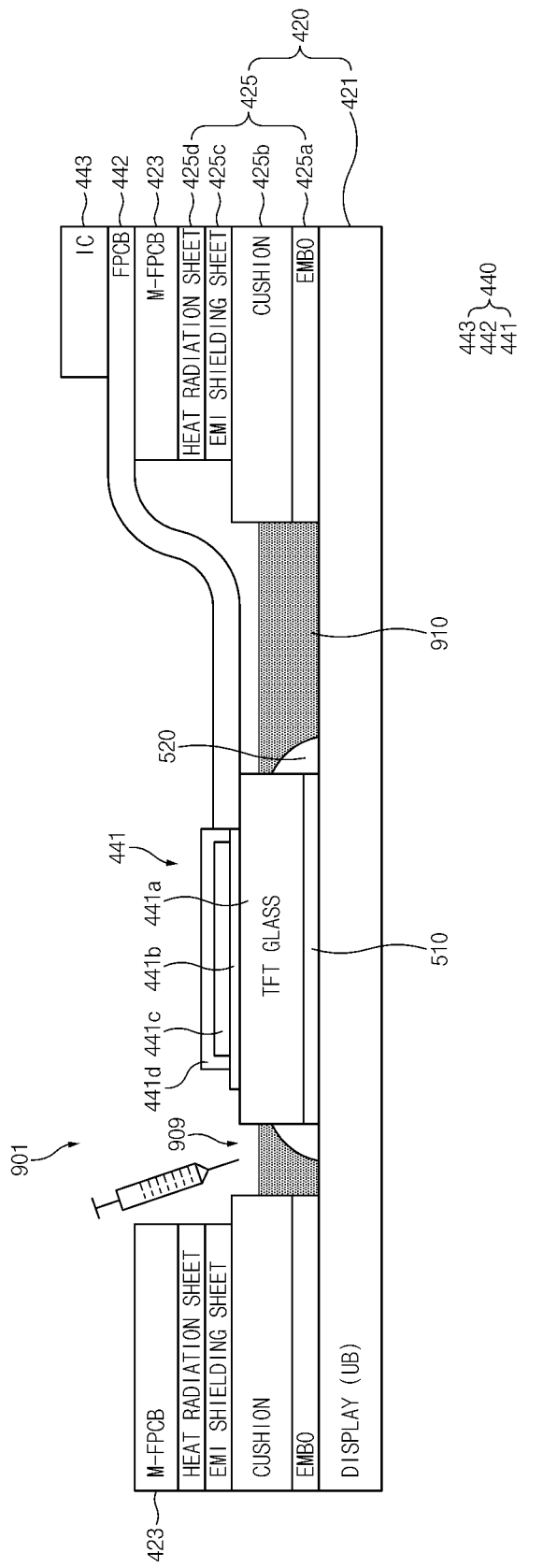
FIG. 9 is a view illustrating the peripheral structure of the biometric sensor, according to an embodiment of the disclosure.

FIG. 9 is a view illustrating the peripheral structure of the biometric sensor, according to an embodiment of the disclosure. The cross-sectional view illustrated in FIG. 9 may be one example of various cross-sectional views taken along line A-A' of FIG. 4B.

Referring to FIG. 9, according to an embodiment, some components of an electronic device 901 (e.g., the electronic device 301 of FIG. 3) may include, for example, the display 420 (e.g., the first panel layer 421 and the second panel layer 425), the first circuit board 423, the biometric sensor module 440, and the sealing layer 910. The biometric sensor module 440 may include, for example, the biometric sensor 441, the second circuit board 442, and the sensor circuit 443. The first panel layer 421, the second panel layer 425, the first circuit board 423, and the biometric sensor module 440 may be the same components as the panel layer, the first circuit board, and the biometric sensor module described above in connection to FIG. 5.

The first fixing member 510 may be interposed between a portion of the first panel layer 421 (on a portion of a rear surface of the first panel layer 421) of the sensor disposing area 909, in which the biometric sensor 441 is disposed, and the biometric sensor 441. The second fixing member 520 may be disposed in at least a portion of the edge of the biometric sensor 441. The second fixing member 520 may be hardened. For example, the biometric sensor 441 may be fixed onto the rear surface of the first panel layer 421 as the second fixing member 520 is UV-hardened by a UV wavelength signal.

The sealing layer 910 may be provided in the sensor disposing area 909 between the biometric sensor 441 and the second panel layer 425. The sealing layer 910 may be disposed to surround the periphery of the biometric sensor 441 while filling the sensor disposing area 909. Accordingly, the sealing layer 910 may be disposed on the rear surface of the first panel layer 421 that is outside the area for the first fixing member 510 and the second fixing member 520. The sealing layer 910 may include, for example, a material (e.g., resin) that exhibits a color similar to the color of the second panel layer 425 or similar to the color of the first fixing member 510. The material constituting the sealing layer 910 may be different from the material constituting the first fixing member 510. The material constituting the sealing layer 910 may include material that does not chemically react with the first fixing member 510 and the second fixing member 520 so as to prevent adhesion force from being reduced due to the chemical reaction.

The sealing layer 910 may be liquid resin having black color (or a color similar to the display). The sealing layer 910 may be made by applying the liquid resin using ink jet process. When an air layer is present around the biometric sensor 441 in the sensor disposing area 909, the air layer may be visible by the user or viewed when the sensor disposing area 909 is viewed from the outside (e.g., the front surface of the display 420). As the sealing layer 910 replaces the air layer or may be formed around the sensor disposing area 909, the air layer around the sensor disposing area 909 may be removed to improve the visual appearance (or visibility) of the display 420.

When the sealing layer 910 is provided after the biometric sensor 441 is fixed onto the first panel layer 421, the display 420 may be placed in a chamber and heated at a specified temperature for specific time. Accordingly, as the first fixing member 510 and the sealing layer 910 are simultaneously hardened by heat applied in the chamber, the biometric sensor 441 may be more firmly fixed on the first panel layer 421. As the color of the hardened sealing layer 910 is similar to the colors of the second panel layer 425 and the first fixing member 510, color differences between the sensor disposing area 909 and portions of the display panel layer outside the sensor disposing area 909 may not be visible. That is, the noticeable difference is not made between the panel layer of the sensor disposing area 909 and the panel layer of the peripheral area of the sensor disposing area 909, thereby the visual quality of the display 420 may be improved.

Figure 10:
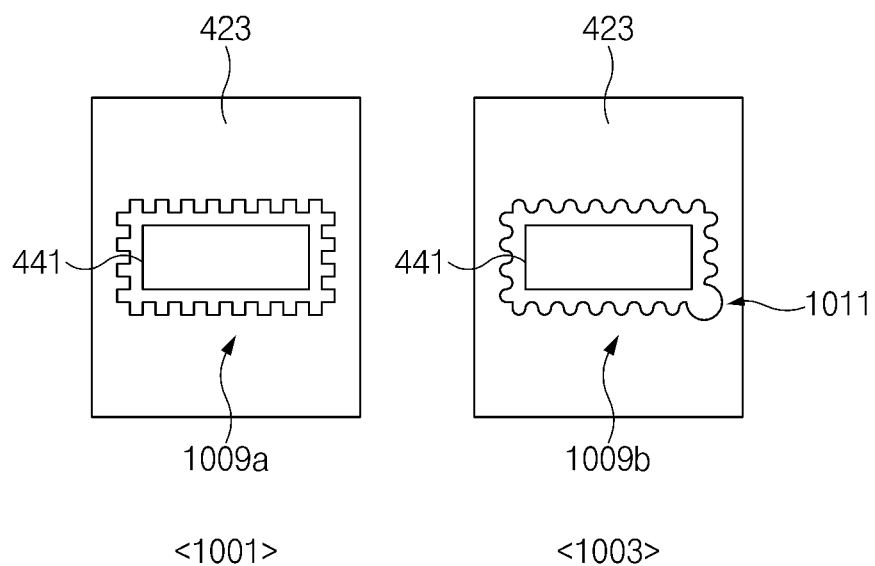
FIG. 10 are views illustrating sensor disposing areas, according to two embodiments of the disclosure.

FIG. 10 is views illustrating sensor disposing areas, according to two embodiments of the disclosure.

Referring to FIG. 10, the first circuit board 423 is disposed on the rear surface of the display 420, as described in FIG. 9, and a first-type sensor disposing area (e.g., a groove or a hole) 1009a may be formed in the first circuit board 423 in association with the arrangement of the biometric sensor 441, as shown in state 1001. When a user views the rear surface of the display 420, at least a portion of the first type sensor disposing area 1009a, in which the biometric sensor 441 is arranged, may be provided in a roughness pattern, for example, a fortress pattern (or zig-zag pattern). This may be alternatively described as the inner sidewall of the first type sensor disposing area 1009a having a pattern of roughness. In the first type sensor disposing area 1009a, for example, at least one of the first sub-layer 425a, the second sub-layer 425b, the third sub-layer 425c, or the fourth sub-layer 425d included in the second panel layer 425 as described with reference to FIG. 9 may have rough edges. For example, the fourth sub-layer 425d may be provided in the roughness pattern, or the third sub-layer 425c and the fourth sub-layer 425d may be provided in the roughness pattern. Alternatively, the second sub-layer 425b, the third sub-layer 425c, and the fourth sub-layer 425d may be provided in the roughness pattern. Alternatively, the first sub-layer 425a, the second sub-layer 425b, the third sub-layer 425c, and the fourth sub-layer 425d may be provided in the roughness pattern.

When the user views the display 420, a second type sensor disposing area 1009b, in which the biometric sensor 441 is arranged, may be provided, where the second type sensor disposing area 1009b has wavy edges. In addition, one corner of the second type sensor disposing area 1009b may be provided in the form of a groove 1011 that is larger than the other periphery of the second type sensor disposing area 1009b. The groove 1011 may serve as an injection site for the sealing layer 910 described with reference to FIG. 9. When the liquid resin of the sealing layer 910 is injected into the first type sensor disposing area 1009a or the second type sensor disposing area 1009b, the above-described rough or wavy edges cause a capillary action, thereby smoothly spreading the liquid resin without forming an additional space (e.g., an air layer) on the bottom surface of the first type sensor disposing area 1009a or the second type sensor disposing area 1009b and also preventing air bubbles.

Figure 11:
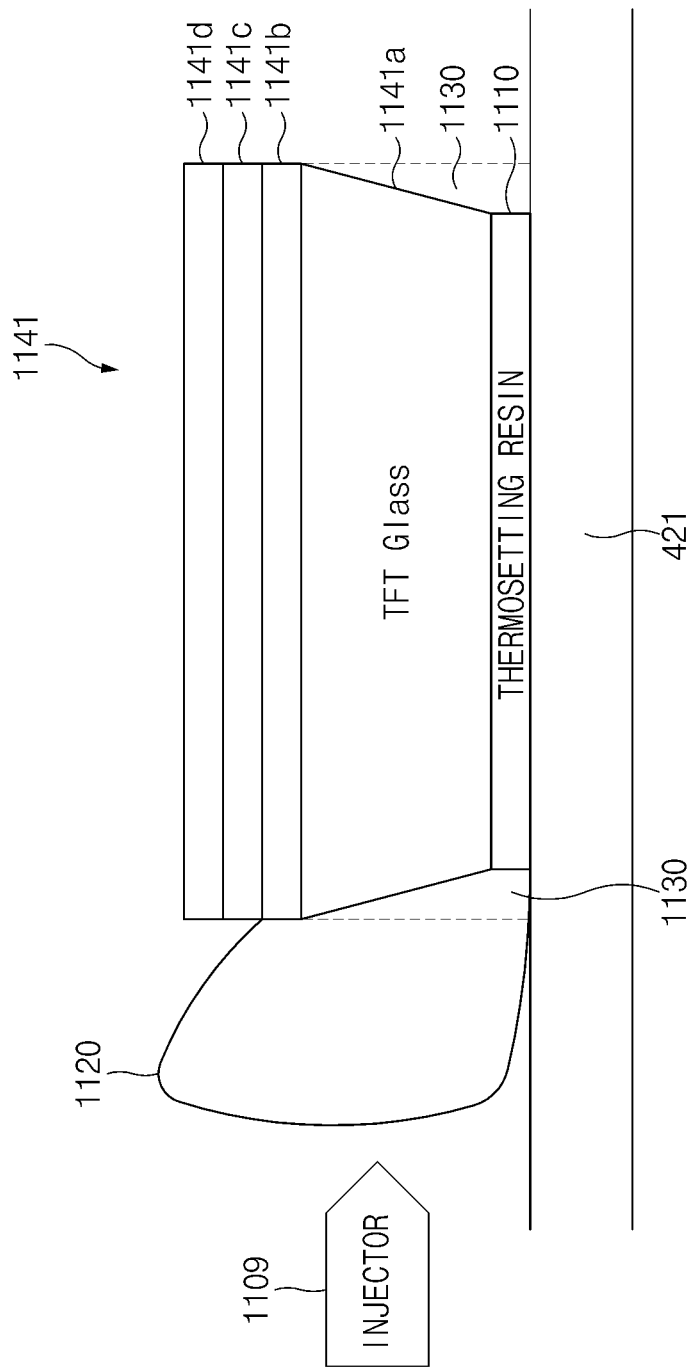
FIG. 11 is a view illustrating another embodiment of a board layer of the biometric sensor, according to an embodiment of the disclosure.

FIG. 11 is a view illustrating another embodiment of the board layer of the biometric sensor, according to an embodiment of the disclosure.

Referring to FIG. 11, a biometric sensor 1141 (e.g., the biometric sensor module 340 of FIG. 3) may include a board layer 1141a, a circuit layer 1141b, a first electrode layer 1141c, and a second electrode layer 1141d. The board layer 1141a may have a shape that gradually tapers from the top to bottom, as illustrated in FIG. 11. A first fixing member 1110 may be interposed between the board layer 1141a and the first panel layer 421.

As described above, as the board layer 1141a is provided with a specific inclination, or is provided to be overhung from its lower portion (e.g., the portion facing the first panel layer 421, an escape area 1130 may be formed between the board layer 1141a and the first panel layer 421. For example, a second fixing member 1120 or the sealing layer 910 described with reference to FIG. 10 may be formed in the escape area 1130 by an injector 1109. Accordingly, the contact area of the second fixing member 1120 or the sealing layer 910 may be maintained to be wider as compared with the shape of the board layer as illustrated in prior drawings which has a straight edge (e.g., the shape that the upper and lower portions of the board layer in FIG. 9 are in a straight line).

According to an embodiment, an electronic device may include a display including a first surface facing a first direction to output display information and a second surface facing a second direction opposite the first direction, a biometric sensor including a sensing surface disposed to face a partial area of the second surface of the display and a side surface formed in a lateral direction, a first fixing member interposed between the partial area and the biometric sensor such that the sensing surface is attached to the partial area, and hardened (e.g., hardened by heat) at a specified temperature, and a second fixing member attached to at least a portion of the side surface and at least a portion of a peripheral area adjacent to the partial area and hardened by light of a specified wavelength.

According to an embodiment, the biometric sensor may transmit or receive a signal having an ultrasonic band (or an ultrasonic signal).

According to an embodiment, the display may a first panel layer and a second panel layer, the partial area of the second surface may include an area in which a portion of a rear surface of the first panel layer is exposed when at least a portion of the second panel layer is removed, and the first fixing member may be interposed between the rear surface of the first panel layer and the biometric sensor.

According to an embodiment, the first panel layer may include a polyethylene terephthalate (PET) layer.

According to an embodiment, the display may include a first panel layer and a second panel layer, the partial area of the second surface may include an area in which a portion of a rear surface of the first panel layer is exposed when at least a portion of the second panel layer is removed, the electronic device may further include an auxiliary layer disposed in the area in which the portion of the rear surface of the first panel layer is exposed, and the first fixing member may be interposed between the biometric sensor and the auxiliary layer.

According to an embodiment, the auxiliary layer may include a black ink layer.

According to an embodiment, the display may include a first panel layer and a second panel layer, and the first fixing member may be interposed between at least one of a plurality of sub-layers and the biometric sensor.

According to an embodiment, the at least one sub-layer of the plurality of may include an embossed layer.

According to an embodiment, the display may include a first panel layer and a second panel layer, the partial area of the second surface may include an area in which a portion of a rear surface of the first panel layer is exposed when at least a portion of the second panel layer is removed, and the electronic device may further include a sealing layer which covers the side surface of the biometric sensor and the second fixing member and is disposed on the area in which the portion of the rear surface of the first panel layer is exposed.

According to an embodiment, the display may include a first panel layer, a second panel layer, and a first circuit board to transmit a signal for driving the display, and the partial area of the second surface may include a sensor disposing area in which a portion of a rear surface of the first panel layer is exposed when at least a portion of the second panel layer and the first circuit board is removed.

According to an embodiment, the sensor disposing area may include includes one or more rough edges (e.g., the edges of the sensor disposing area may form a plurality of valleys and a plurality of ridges).

According to an embodiment, the sensor disposing area may include at least one groove formed on one side of the sensor disposing area and having a size greater than sizes of some of the one or more rough edges.

According to an embodiment, the electronic device may further include a sealing layer injection port provided at one side of the sensor disposing area to inject resin associated with forming the sealing layer.

According to an embodiment, the electronic device may further include at least one spacer interposed between at least one corner of the biometric sensor and the second surface, and the second fixing member may be disposed between the spacer and the partial area of the second surface.

According to an embodiment, the electronic device may further include at least one groove formed in at least one corner of the biometric sensor, and the second fixing member may be disposed between the groove and the partial area of the second surface.

According to an embodiment, the electronic device may further include a sensor circuit connected with the biometric sensor, and a second circuit board electrically connecting the biometric sensor with the sensor circuit.

According to an embodiment, the biometric sensor may include a board layer facing the second surface, and a transceiving layer to transmit or receive an ultrasonic wave through the board layer. The transceiving layer may include a piezoelectric material layer, an electrode layer, and a circuit layer interposed between the piezoelectric material layer and the electrode layer.

According to an embodiment, the board layer may include a TFT wire.

According to an embodiment, the board layer may include at least one of a silicon layer, an insulated silicon layer, a thin film transistor (TFT) layer, a glass layer, a plastic layer, or a ceramic layer.

According to an embodiment, an edge of the first fixing member may be between an edge of the board layer of the biometric sensor and an edge of an active area of the biometric sensor.

According to an embodiment, the area of the first fixing member may be smaller than the area of the board layer but larger than the area of the transceiving layer.

Figure 12:
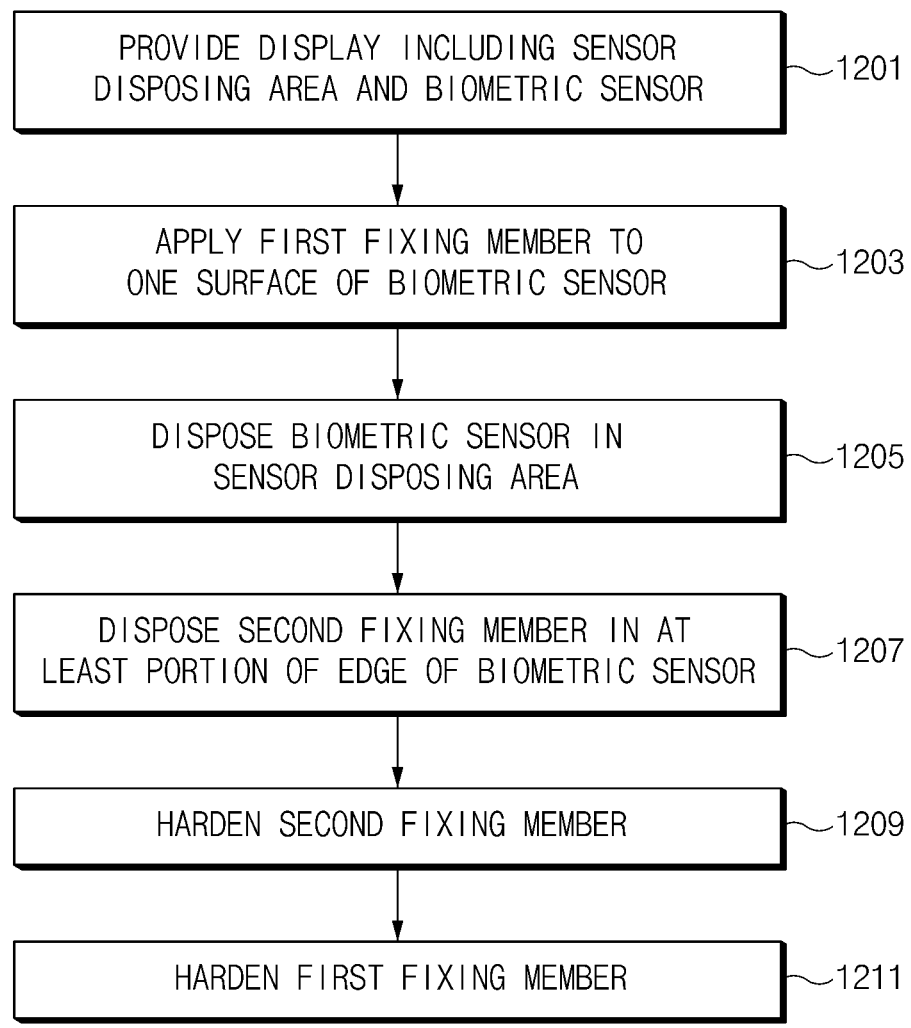
FIG. 12 is a flowchart illustrating a method for manufacturing the display in which the biometric sensor is provided, according to an embodiment of the disclosure.

FIG. 12 is a flowchart illustrating a method for manufacturing a display in which a biometric sensor is provided, according to an embodiment of the disclosure.

Referring to FIG. 12, according to an embodiment, in operation 1201 in the method for manufacturing the display, a display including a sensor disposing area (e.g., the sensor disposing area 409 of FIG. 4A) and a biometric sensor to be disposed in the sensor disposing area may be provided.

In operation 1203, the first fixing member in a first state (e.g., a non-hardening state) may be applied onto one surface (e.g., the surface of a board layer) of the biometric sensor. Non-hardening state means a state before the first fixing member is hardened by heat. For example, the first fixing member may be applied onto one surface of the biometric sensor using an ink jet process or the like.

In operation 1205, the biometric sensor may be disposed in the sensor disposing area. In this operation, the biometric sensor may be gripped by using a jig and may be disposed on the bottom surface of the sensor disposing area (e.g., the rear surface of the panel layer, a top surface of the first sub-layer, or a top surface of an auxiliary layer applied onto the panel layer). In this case, as specific pressure is applied to the biometric sensor, the first fixing member may be spread to a specific thickness between the biometric sensor and the panel layer.

In operation 1207, a second fixing member in the first state (the non-hardening state) may be disposed in at least a portion of an edge of the biometric sensor. For example, the second fixing member may be applied to four corner portions of the biometric sensor. In this case, non-hardening state of the second fixing member means a state before the second fixing member is hardened by UV light.

In operation 1209, the second fixing member may be changed to be in the second state (a hardening state) through the hardening process. In this case, the second fixing member may be hardened as UV light is irradiated. Accordingly, the biometric sensor may be fixed onto one surface of the display panel layer. The hardening process may include irradiating UV light for several seconds to several tens of seconds (e.g., about 6 seconds). The UV hardening process may be kept brief to prevent the hardening of the first fixing member from being delayed, thereby minimizing the possibility of mixing the first fixing member and the second fixing member.

In operation 1211, the first fixing member in the first state may be changed to be in the second state (e.g., the hardening state) at a specified temperature for specified time. In this case, the fixing member may be hardened by heat. For example, the hardening process may include a process of heating the display at about 50° C.-100° C. (e.g., about 70° C.) for about 5-20 minutes (e.g., about 10 minutes).

According to an embodiment, a sealing layer may be formed at an exposed portion of the panel layer or a peripheral portion of the biometric sensor through operation 1209 and operation 1211. In this regard, the liquid resin used to form a sealing layer may be injected into the edge of the biometric sensor in the sensor disposing area. When the display applied with the sealing layer is disposed in the first chamber, the first fixing member and the sealing layer may be simultaneously hardened in the heating process. For example, as heat having a specific temperature is applied to the first fixing member and the sealing layer, the first fixing member and the sealing layer may be hardened by heat.

According to an embodiment, a method for manufacturing an electronic device may include providing a display and a biometric sensor, applying a first fixing member on a sensing surface of the biometric sensor, disposing a sensing surface of the biometric sensor, to which the first fixing member is applied, on a rear surface of the display, applying a second fixing member to at least a portion of a periphery of the biometric sensor, hardening the second fixing member, and hardening the first fixing member. For example, the hardening of the second fixing member may include hardening the second fixing member through UV light, and the hardening of the first fixing member may include hardening the first fixing member through heat.

According to an embodiment, the method for manufacturing the electronic device may further include injecting a sealing layer to cover the second fixing member after applying the second fixing member.

Figure 13:
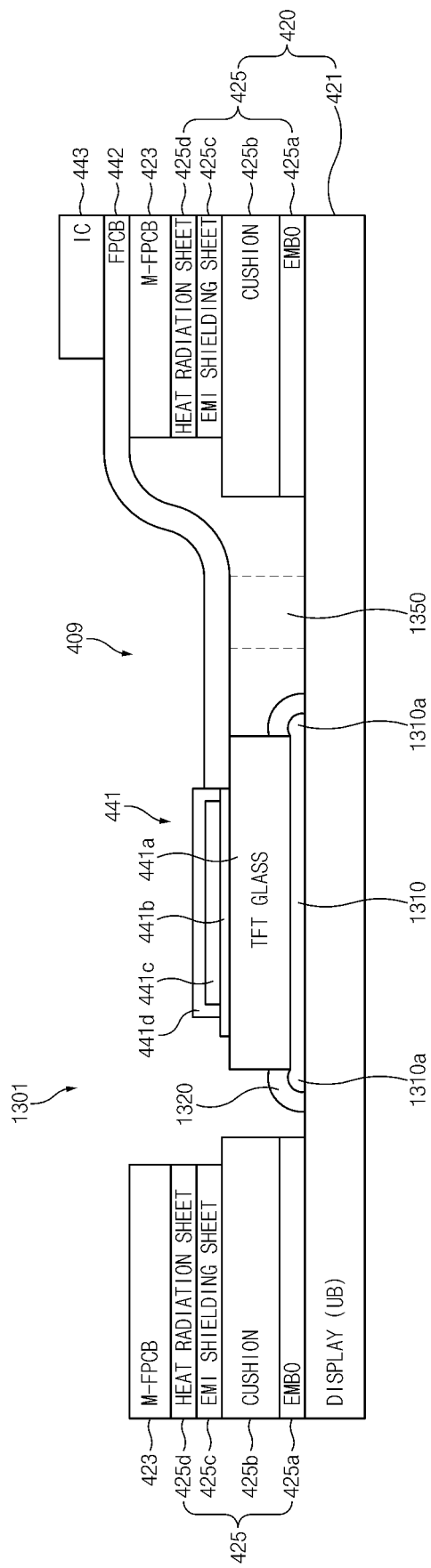
FIG. 13 is a view illustrating a sensor disposing area, according to another embodiment of the disclosure.

FIG. 13 is a view illustrating a sensor disposing area, according to another embodiment of the disclosure.

Referring to FIG. 13, an electronic device 1301 (e.g., the electronic device 501 of FIG. 3) may include the display (e.g., the display 320 of FIG. 3) 420 including the first panel layer 421 and the second panel layer 425, the first circuit board 423 described with reference to FIG. 4A or FIG. 5, and the biometric sensor module (the biometric sensor 441, the second circuit board 442, and the sensor circuit 443). The electronic device 1301 may include a first fixing member 1310 (or a first adhesive member) and a second fixing member 1320 (or the second adhesive member) to fix the biometric sensor 441 in the biometric sensor module. A cover glass may be further disposed on one surface of the first panel layer 421.

The second panel layer 425 may include the first sub-layer 425*a*, the second sub-layer 425*b*, the third sub-layer 425*c*, and the fourth sub-layer 425*d*. Although the drawing illustrates that the second panel layer 425 includes the first sub-layer 425*a*, the second sub-layer 425*b*, the third sub-layer 425*c*, or the fourth sub-layer 425*d*, the disclosure is not limited thereto. For example, the second panel layer 425 may include only some of the sub-layers. The first sub-layer 425*a* may include, for example, an embossed layer. The second sub-layer 425*b* may include, for example, a cushion layer to absorb impact. The third sub-layer 425*c* may include, for example, an electro-magnetic interference (EMI) shielding sheet (e.g., Cu sheet) to shield EMI. The fourth sub-layer 425*d* may include, for example, a heat radiation sheet (e.g., a graphite sheet) to radiate heat emitted from the first panel layer 421.

The biometric sensor module may include, for example, the biometric sensor 441, the second circuit board 442, and the sensor circuit 443. The biometric sensor 441 may irradiate a signal having a specific wavelength band (e.g., an ultrasonic signal) and then may collect a reflected signal. The biometric sensor 441 may substantially have the same configuration of the biometric sensor described above with reference to FIG. 5. In addition, other components associated with the biometric sensor module may substantially have the same as the configuration of the biometric sensor described above with respect to FIG. 5.

At least a portion of the first fixing member 1310 may be interposed between the biometric sensor 441 and the first panel layer 421. That is, the first fixing member 1310 may be interposed between the board layer 441*a* of the biometric sensor 441 and the first panel layer 421. The first fixing member 1310 may include epoxy resin, which is hardened when heat is applied at a specified temperature for specified time. The first fixing member 1310 may be applied to one surface (e.g., on the board layer 441*a*) of the biometric sensor 441 or applied to the sensor disposing area 409 of the first panel layer 421 via injection.

The biometric sensor 441, in which the first fixing member 1310 is applied to the board layer 441*a*, may be placed on the first panel layer 421 of the sensor disposing area 409 using a jig. In this case, as the first fixing member 1310 is interposed between the biometric sensor 441 and the first panel layer 421 and pressed in the direction of the first panel layer 421, a portion of the first fixing member 1310 may protrude in a side direction of the biometric sensor 441, thereby forming a fillet structure 1310*a*. The fillet structure 1310*a* may be present along the entire peripheral edge of the biometric sensor 441 or may be present along the four sides of the biometric sensor 441. As the fillet structure 1310*a* is formed by pressing the biometric sensor 441, at least a portion of the fillet structure 1310*a* may have a convex shape.

The second fixing member 1320 may be used to fix the biometric sensor 441, after the biometric sensor 441 is placed on the rear surface of the first panel layer 421 corresponding to the sensor disposing area 409 and after the first fixing member 1310 in a first state (non-hardening state) is applied. In this regard, the second fixing member 1320 may be disposed in at least a portion of the periphery of the biometric sensor 441. For example, the second fixing member 1320 may be applied to a corner portion (e.g., an apex at which two sides of the edge meet each other) of the biometric sensor 441. Alternatively, the second fixing member 1320 may be applied to at least a portion of an edge circumference (e.g. the side surface) of the biometric sensor 441, the biometric sensor 441 may be fixed onto the rear surface of the first panel layer 421 corresponding to the sensor disposing area 409.

When at least a portion of the second fixing member 1320 is applied onto at least a portion of the first fixing member 1310 and when the second fixing member 1320 and the first fixing member 1310 have the same property, the first fixing member 1310 and the second fixing member 1320 may be mixed with each other. Accordingly, the second fixing member 1320 may be an adhesive member having the property different from the property of the first fixing member 1310. For example, the second fixing member 1320 may include at least one of a UV-curable resin, a urethane-based resin, or an acrylic-based resin. Accordingly, the second fixing member 1320 may include a material that does not chemically react with the first fixing member 1310. For example, the second fixing member 1302 may include a material that chemically reacts with the first fixing member 1310 to generate heat under a certain degree so as to prevent adhesion force from being reduced due to the chemical reaction with the first fixing member 1310.

The biometric sensor module or a display structure having the biometric sensor module attached thereto may further include a conductive tape 1350 adhering to one side of the second circuit board 442. One side of the conductive tape 1350 may be in contact with the second circuit board 442, and the opposite side of the conductive tape 1350 may adhere to one side of the first panel layer 421. The conductive tape 1350 may serve as the ground of the second circuit board 442. According to other embodiments, as in the above description made with reference to FIGS. 5 and 6, the biometric sensor module may not include the conductive tape 1350. Accordingly, the conductive tape 1350 may be omitted.

Figure 14:
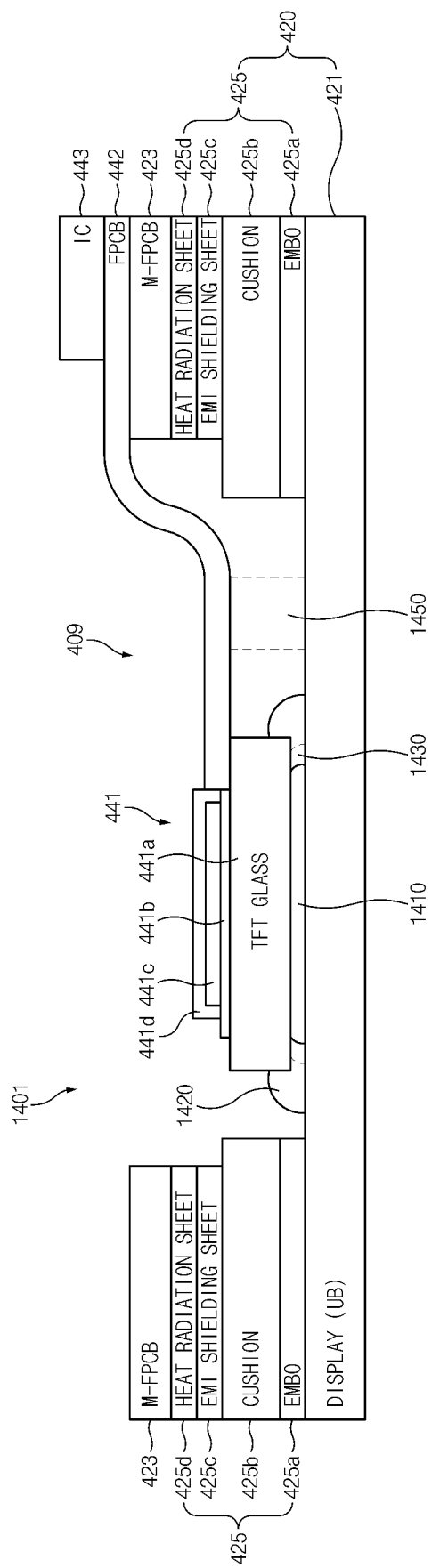
FIG. 14 illustrates a sensor disposing area, according to yet another embodiment of the disclosure.

FIG. 14 illustrates a sensor disposing area, according to yet another embodiment of the disclosure.

Referring to FIG. 14, an electronic device 1401 (e.g., the electronic device 301 of FIG. 3) may include a display (e.g., the display 320 of FIG. 3) including the first panel layer 421 and the second panel layer 425, the first circuit board 423 described with reference to FIG. 4A or FIG. 5, and the biometric sensor module (a biometric sensor 441, the second circuit board 442, and the sensor circuit 443). Components of the electronic device 1401 may be substantially identical to the components described with reference to FIG. 13, except for the first fixing member 1410 and the second fixing member 1420.

The first fixing member 1410 may be interposed between the board layer 441a (or a TFT layer) and the first panel layer 421. The shape of the first fixing member 1410 may be changed by external pressure (e.g., the pressure applied to the biometric sensor). The amount of the first fixing member 1410 may prevent the fillet structure 1310a, which has been described with reference to FIG. 13, from being formed after the first fixing member 1410 is pressed by the biometric sensor 441. Such an amount of the first fixing member 1410 may be determined experimentally. As the first fixing member 1410 is disposed between the board layer 441a and the first panel layer 421 without protruding out of the edge of the biometric sensor 441, the edge of the first fixing member 1410 may be positioned inside the board layer 441a of the biometric sensor 441 as illustrated in FIG. 14.

The second fixing member 1420 may be disposed at one side (e.g., corners) of the biometric sensor 441 to temporarily fix the biometric sensor 441 while the first fixing member 1410 is in the first state (e.g., the non-hardening state). As the first fixing member 1410 is disposed such that the first fixing member 1410 does not protrude out, the second fixing member 1420 may be interposed between the side surface of the biometric sensor 441 and a portion of the bottom surface of the biometric sensor 441. Accordingly, an air gap 1430 may be formed between the second fixing member 1420 and the first fixing member 1410. Although the air gap 1430 is formed between the first fixing member 1410 and the second fixing member 1420 in the drawing, the disclosure is not limited thereto. For example, while one corner has the air gap 1430 formed between the first fixing member 1410 and the second fixing member 1420, a different corner may have the first fixing member 1410 and the second fixing member 1420 in contact with each other without the air gap 1430.

In the electronic device 1401 having the above structure, as the edge of the first fixing member 1410 stays inside the board layer 441a, the user may not be able to visually discern the first fixing member 1410. Accordingly, when the first fixing member 1410 is positioned inside the board layer 441a, the visual appearance of the display 420 may be improved. Additionally, when the user views the display 420, the first fixing member 1410 may be disposed such that the first fixing member 1410 covers that area where the ultrasonic wave is transceived. For example, the first fixing member 1410 may be disposed with the size equal to or greater than the width of the circuit layer 441b, the width of the piezoelectric material layer 441c, or the width of the electrode layer 441d.

Figure 15:
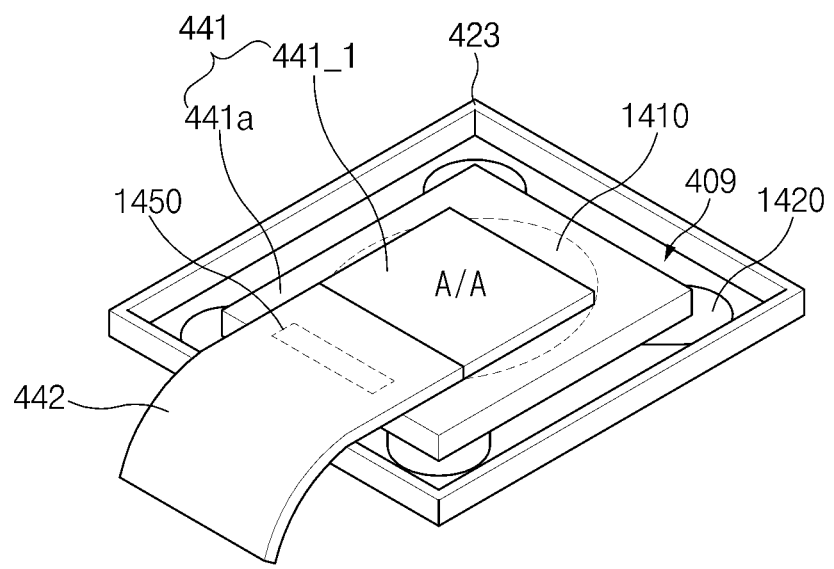
FIG. 15 is a view illustrating one surface of the sensor disposing area of FIG. 14.
Figure 16:
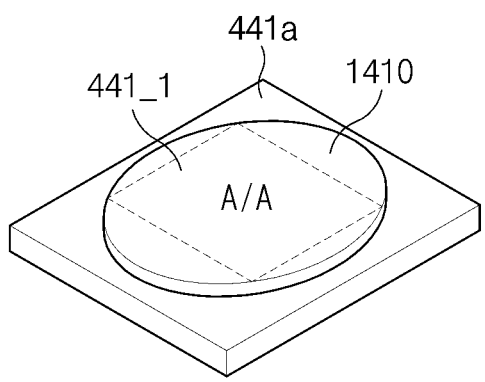
FIG. 16 is a view illustrating another surface of the sensor disposing area of FIG. 14.

FIG. 15 is a view illustrating one surface of a sensor disposing area of FIG. 14, and FIG. 16 is a view illustrating another surface of the sensor disposing area of FIG. 14.

Referring to FIGS. 15 and 16, the electronic device may include a groove 409 in which the biometric sensor 441 is disposed. According to an embodiment, the height of the biometric sensor 441 may be less than the height of the groove 409. For example, the groove 409 may have the height from the bottom of the rear surface of the first panel layer 421 of the display 420 to a top surface of the first circuit board 423. Alternatively, the groove 409 may be formed by removing a portion from the embossed layer 425a of layers disposed on the rear surface of the first panel layer 421 to the first circuit board 423. Alternatively, as described above, when a certain layer (e.g., the embossed layer 425a) is maintained or a specific layer (e.g., the auxiliary layer 810) is formed on the rear surface of the display 420, the groove 409 may have the height from the rear surface of the relevant layers to the top of the first circuit board 423, except for the relevant layers (e.g., the embossed layer 425a or the auxiliary layer 810). Although the structure of the groove 409 has been described above in that various layers (e.g., the embossed layer 425a, the cushion layer 425b, the EMI shielding sheet 425c, the heat radiation sheet 425d, and the first circuit board 423) are formed on the rear surface of the display 420 by way of example, at least one of the above-described various layers may be omitted if necessary. For example, the electronic device may include only the embossed layer 425a and/or the cushion layer 425b, or only the EMI shielding sheet 425c and/or the heat radiation sheet 425d. In addition, the thickness of the biometric sensor 441 is described to be less than the height of the groove 409, the disclosure is not limited thereto. For example, if necessary, the thickness of the biometric sensor 441 may be greater than the height of the groove 409. In this case, at least a portion of the biometric sensor 441 protruding beyond the height of the groove 409 may be seated in a groove or a hole of a bracket (or the housing 350 of FIG. 3) disposed on the rear surface of the display 420.

The first circuit board 423 may be disposed at the peripheral portion of the groove 409. The first circuit board 423 may include a circuit board associated with display driving. The groove 409 may be formed to be larger than the biometric sensor 441. The groove 409 may be provided by removing at least a portion of the second panel layer 425. The bottom surface of the groove 409 may be the rear surface (i.e. interior surface) of the first panel layer 421. Alternatively, the bottom surface of the groove 409 may be a partial surface (e.g., the embossed layer) of the second panel layer 425. Alternatively, the bottom surface of the groove 409 may be a black ink layer or a black matrix layer applied on the first panel layer 421, as described above.

As the biometric sensor 441 is pressed after the first fixing member 1410 is applied on the bottom surface of the groove 409, the shape of the first fixing member 1410 may become oval, circular, or distorted circular. The edge of the first fixing member 1410 may be disposed inside the board layer 441a without protruding out of the board layer 441a. The second fixing member 1420 may be disposed in at least one side of an edge of the board layer 441a. For example, the second fixing member 1420 may be applied to a corner area. While the second fixing member 1420 is applied, at least a portion of the second fixing member 1420 may be introduced between the board layer 441a and the first panel layer 421 and a remaining portion of the second fixing member 1420 may be disposed to surround the corner peripheral portion (e.g., at least a portion of the sidewall of the corner) of the board layer 441a. The biometric sensor 441 may include an active area (A/A) 441_1 (e.g., the stack layer of the circuit layer 441b, the piezoelectric material layer 441c, and the electrode layer 441d) to generate and output an ultrasonic signal or to receive an ultrasonic signal. The area in which the first fixing member 1410 is applied may be larger than the edge of the active area 441_1. Accordingly, the edge of the first fixing member 1410 may be between the edge of the board layer 441a (or the TFT layer) and the edge of the active area 441_1. The active area 441_1 may be connected with the second circuit board 442 and may be connected with the sensor circuit 443 separately provided. One side of a conductive tape 1450 may be disposed on one side of the second circuit board 442 and another side of the conductive tape 1450 may be in contact with the bottom surface of the groove 409 (or the sensor disposing area).

As described above, according to an embodiment of the disclosure, in the biometric sensor module and the electronic device including the same, the electronic device may improve its external visual appearance as the edge of the first fixing member 1410 is provided within the edge of the board layer 441a. The first fixing member 1410 may further support to maintain the quality of the ultrasonic signal by forming an edge that is between the edge of the first fixing member 1410 and the edge of the active area 441_1 of the biometric sensor 441.

The edge relationships of the first fixing member 1410 and the edge of the biometric sensor 441, which has been described with reference to FIGS. 14 to 16, may be applied to other embodiments disclosed herein. For example, the shape of the first fixing member 1410 having the edge in size smaller than the size of the edge of the biometric sensor 441 described with reference to FIG. 14 may be applied to the embodiment, described in FIG. 7, where the embossed layer 425a forms the bottom surface of a seating groove (e.g., the sensor disposing area) of the biometric sensor. This edge relationship may also be applied to the embodiments where the auxiliary layer 810 forms the bottom surface of the seating groove of the biometric sensor, the sealing layer 910 fills an empty space of the seating groove of the biometric sensor, the edges of the seating groove of the biometric sensor are rough, or where the sectional surface of the edge of the board layer 441a is gradually tapered toward the first panel layer 421.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with," "coupled to," "connected with," or "connected to" another component (e.g., a second component), it means that the component may be coupled with the other component directly (e.g., wiredly), wirelessly, or via a third component.

As described above, according to certain embodiments of the disclosure, the biometric sensor may be stably fixed onto the rear surface of the display without breaking or modifying the rear surface of the display.

According to certain embodiments of the disclosure, the visual quality of the display may be improved by making an area, in which the biometric sensor is disposed, similar to the peripheral area.

Other various effects may be provided through each embodiment or the combination thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A method for manufacturing an electronic device, the method comprising:
   providing a transparent cover;
   providing a display disposed below the transparent cover and a biometric sensor disposed below the display;
   applying a first fixing member to a sensing surface of the biometric sensor;
   disposing the sensing surface of the biometric sensor, to which the first fixing member is applied, on a bottom surface of the display;

attaching a second fixing member to at least a portion of the biometric sensor and to the bottom surface of the display where the sensing surface is attached through the first fixing member, the second fixing member being disposed in a peripheral area of a partial area of the bottom surface;

hardening the second fixing member; and hardening the first fixing member, wherein the first fixing member is configured to be heat-curable and the second fixing member is configured to be curable by light of a specified wavelength.

2. The method of claim 1, further comprising:

injecting a sealing layer to cover the second fixing member after applying the second fixing member.

3. The method of claim 1, wherein the attaching of the second fixing member further comprises attaching second fixing member to be disposed at a plurality of corners of the biometric sensor.

4. The method of claim 1, wherein the biometric sensor includes a side surface formed in a lateral direction; and wherein the attaching of the second fixing member further comprises attaching second fixing member so that at least a portion of the second fixing member is attached to the side surface.

5. The method of claim 1, wherein the display comprises a plurality of layers, wherein the plurality of layers of the display comprises a first panel layer and a second panel layer, wherein the method further comprises exposing a portion of a bottom surface of the first panel layer by removing at least a portion of the second panel layer, and wherein the applying of the first fixing member further comprises applying the first fixing member to be interposed between the bottom surface of the first panel layer and the biometric sensor.

6. The method of claim 5, wherein the first panel layer comprises:

a polyethylene terephthalate (PET) layer.

7. The method of claim 1, wherein the display comprises a plurality of layers, wherein the plurality of layers of the display comprises a first panel layer and a second panel layer, wherein the method further comprises:

exposing a portion of a bottom surface of the first panel layer by removing at least a portion of the second panel layer; and providing an auxiliary layer disposed in an area in which the portion of the bottom surface of the first panel layer is exposed, and wherein the applying of the first fixing member further comprises applying the first fixing member to be interposed between the biometric sensor and the auxiliary layer.

8. The method of claim 7, wherein the auxiliary layer comprises:

a black ink layer.

9. The method of claim 1, wherein the display comprises a plurality of layers, wherein the plurality of layers of the display comprises a first panel layer and a second panel layer including a plurality of sub-layers, and wherein the applying of the first fixing member further comprises applying the first fixing member to be interposed between at least one of the plurality of sub-layers and the biometric sensor.

10. The method of claim 9, wherein the at least one of the plurality of sub-layer comprises:

an embossed layer.

11. The method of claim 1, wherein the display comprises a plurality of layers, wherein the plurality of layers of the display comprises a first panel layer and a second panel layer, and wherein the method further comprises:

exposing a portion of a bottom surface of the first panel layer by removing at least a portion of the second panel layer; and providing a sealing layer which covers a side surface of the biometric sensor and the second fixing member and is disposed on an area in which the portion of the bottom surface of the first panel layer is exposed.

12. The method of claim 1, wherein the display comprises a plurality of layers, wherein the plurality of layers of the display comprises a first panel layer, a second panel layer, and a first circuit board configured to transmit a signal for driving the display, and wherein the method further comprises creating a sensor disposing area of the bottom surface of the display by removing at least a portion of the second panel layer and the first circuit board to expose a portion of a bottom surface of the first panel layer.

13. The method of claim 12, wherein the sensor disposing area includes one or more rough edges.

14. The method of claim 13, wherein the sensor disposing area further comprises at least one groove formed on one side of the sensor disposing area and having a size greater than sizes of some of the one or more rough edges.

15. The method of claim 1, further comprising:

providing at least one spacer interposed between at least one corner of the biometric sensor and the bottom surface of the display, wherein the attaching of the second fixing member further comprises attaching the second fixing member to be disposed between the spacer and a partial area of the bottom surface of the display.

16. The method of claim 1, further comprising:

forming at least one groove in at least one corner of the biometric sensor, wherein the attaching of the second fixing member further comprises attaching the second fixing member to be disposed between the groove and the partial area of the bottom surface of the display.

17. The method of claim 1, further comprising:

providing a sensor circuit connected with the biometric sensor; and providing a second circuit board electrically connecting the biometric sensor with the sensor circuit.

18. The method of claim 1, wherein the biometric sensor comprises:

a board layer facing the bottom surface of the display; and a transceiving layer configured to transmit or receive an ultrasonic wave through the board layer, and wherein the biometric sensor transmits or receives an ultrasonic signal.

19. The method of claim 18, wherein the board layer comprises:

at least one of a silicon layer, an insulated silicon layer, a thin film transistor (TFT) layer, a glass layer, a plastic layer, or a ceramic layer.

20. The method of claim 18, wherein an area of the first fixing member is smaller than an area of the board layer and larger than an area of the transceiving layer.

* * * * *